Figure 16:
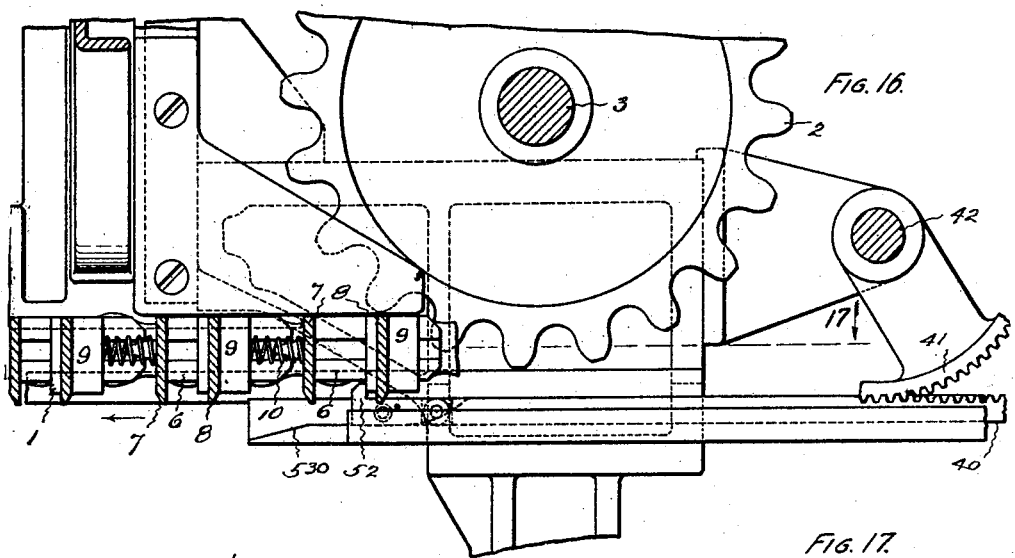

Sept. 22, 1931.  C. SCHRAMM ET AL  1,824,506
MACHINE FOR BACK LINING BOOKS
Filed July 31, 1930    17 Sheets-Sheet 1
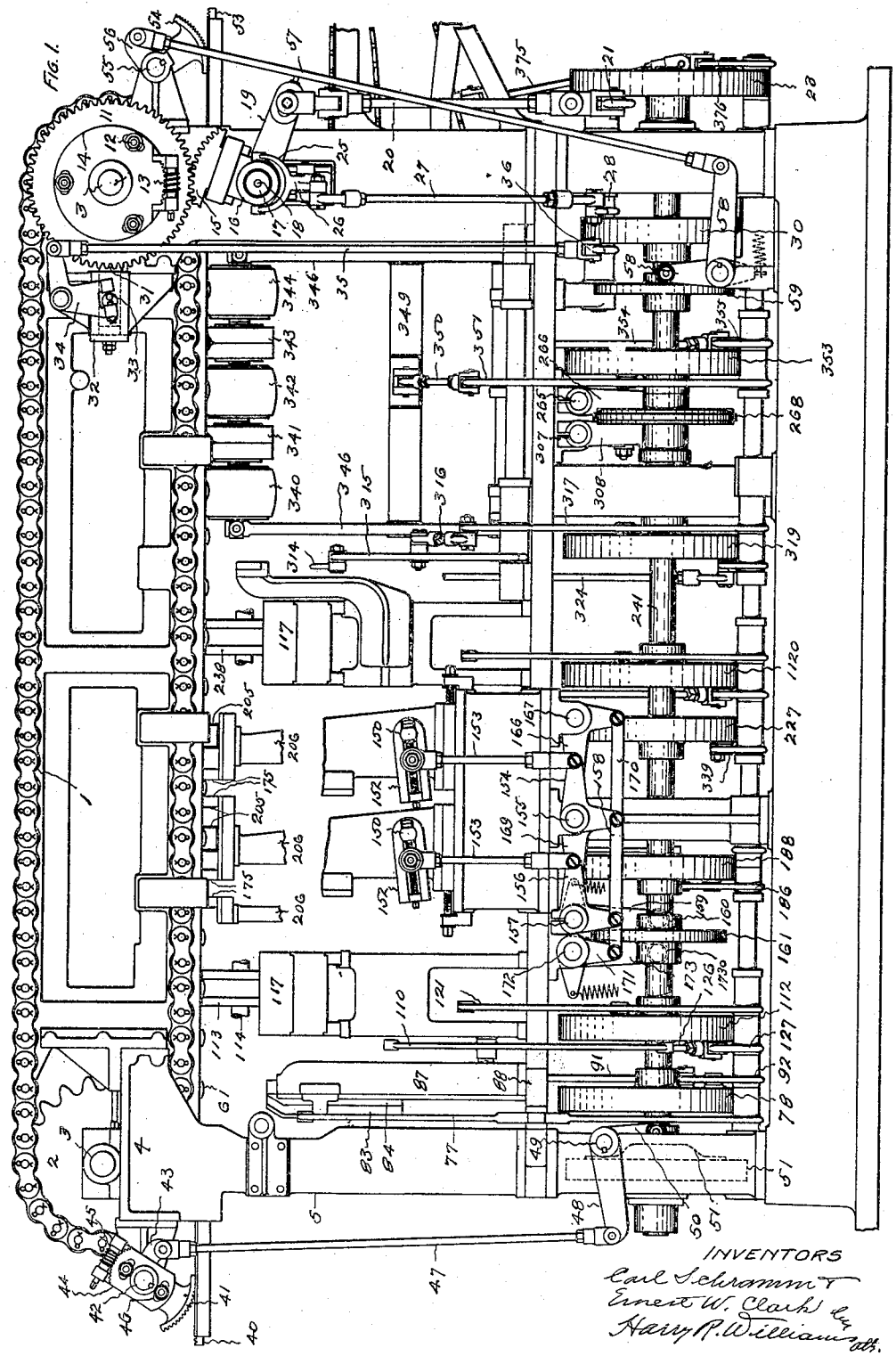
INVENTORS
Carl Schramm &
Ernest W. Clark &
Harry P. Williams

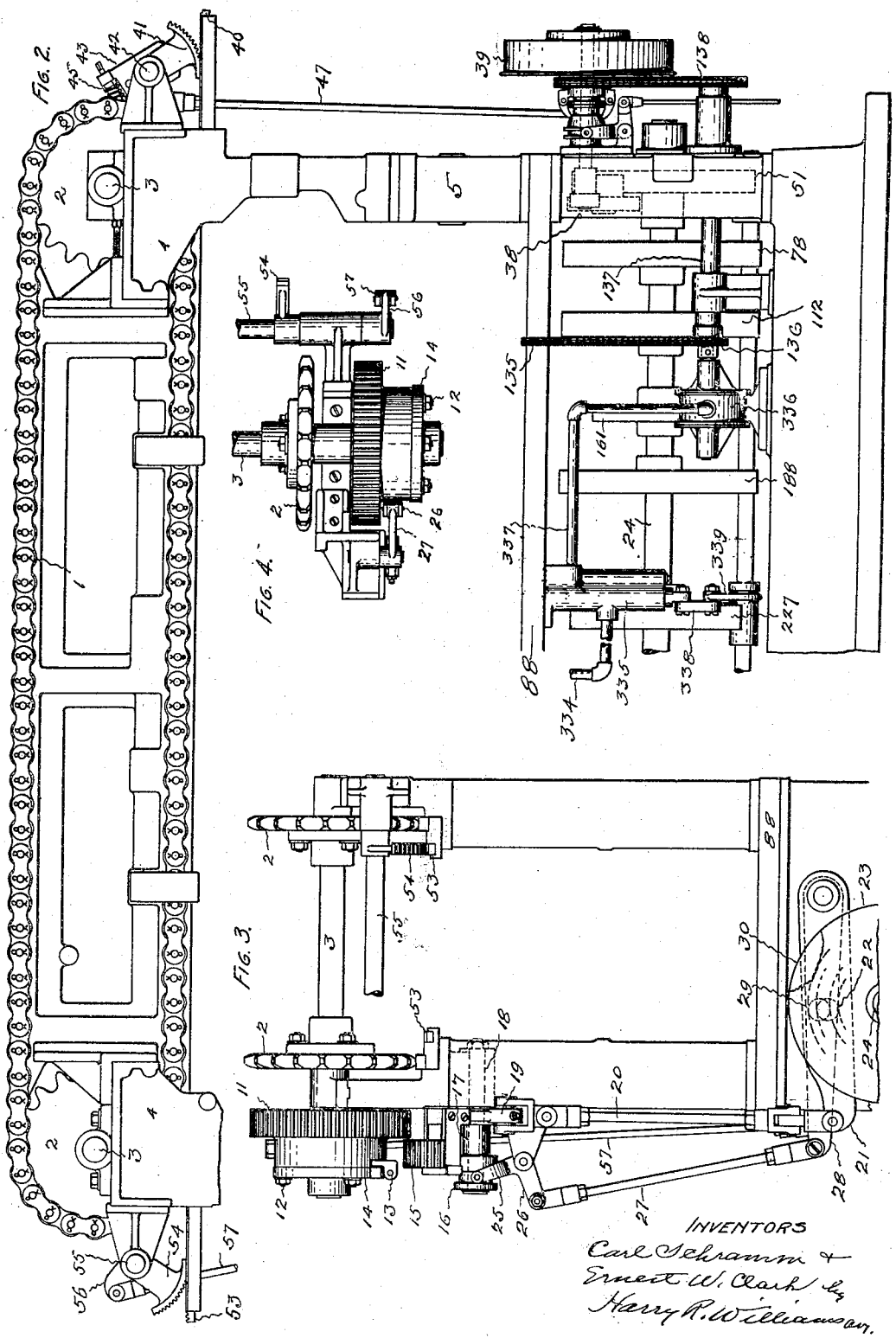

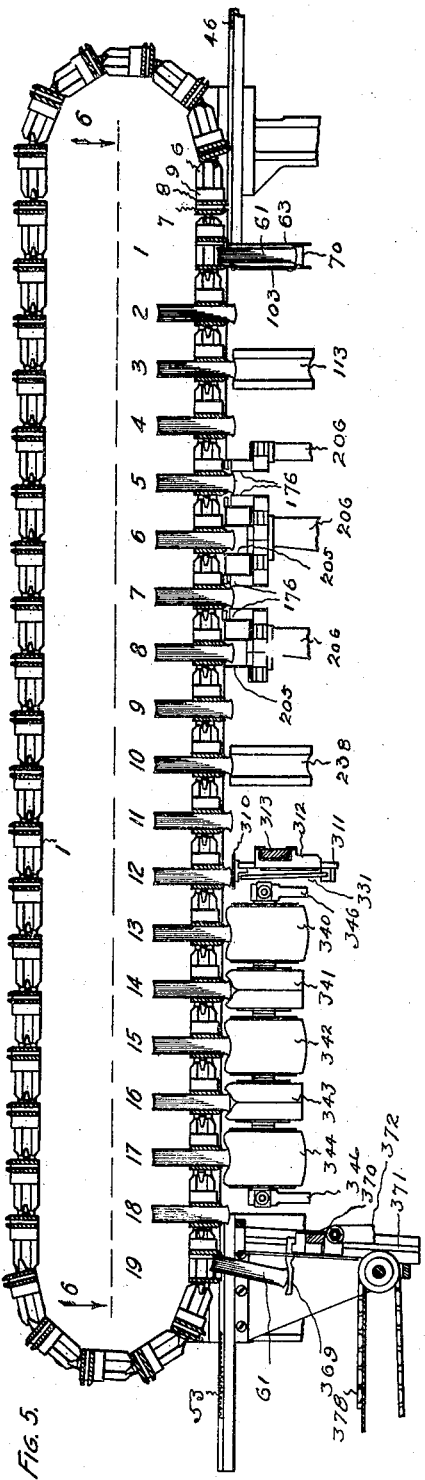

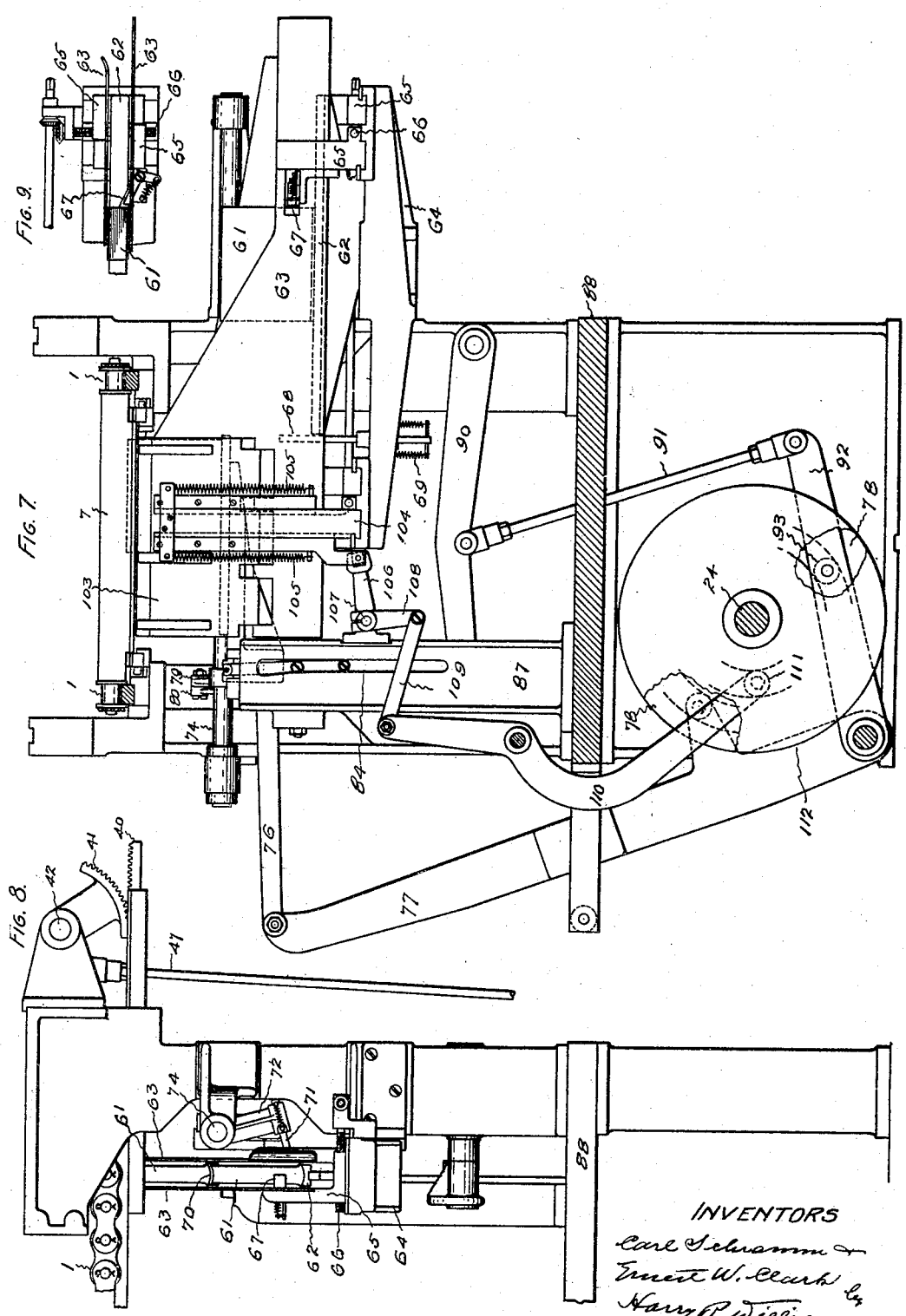

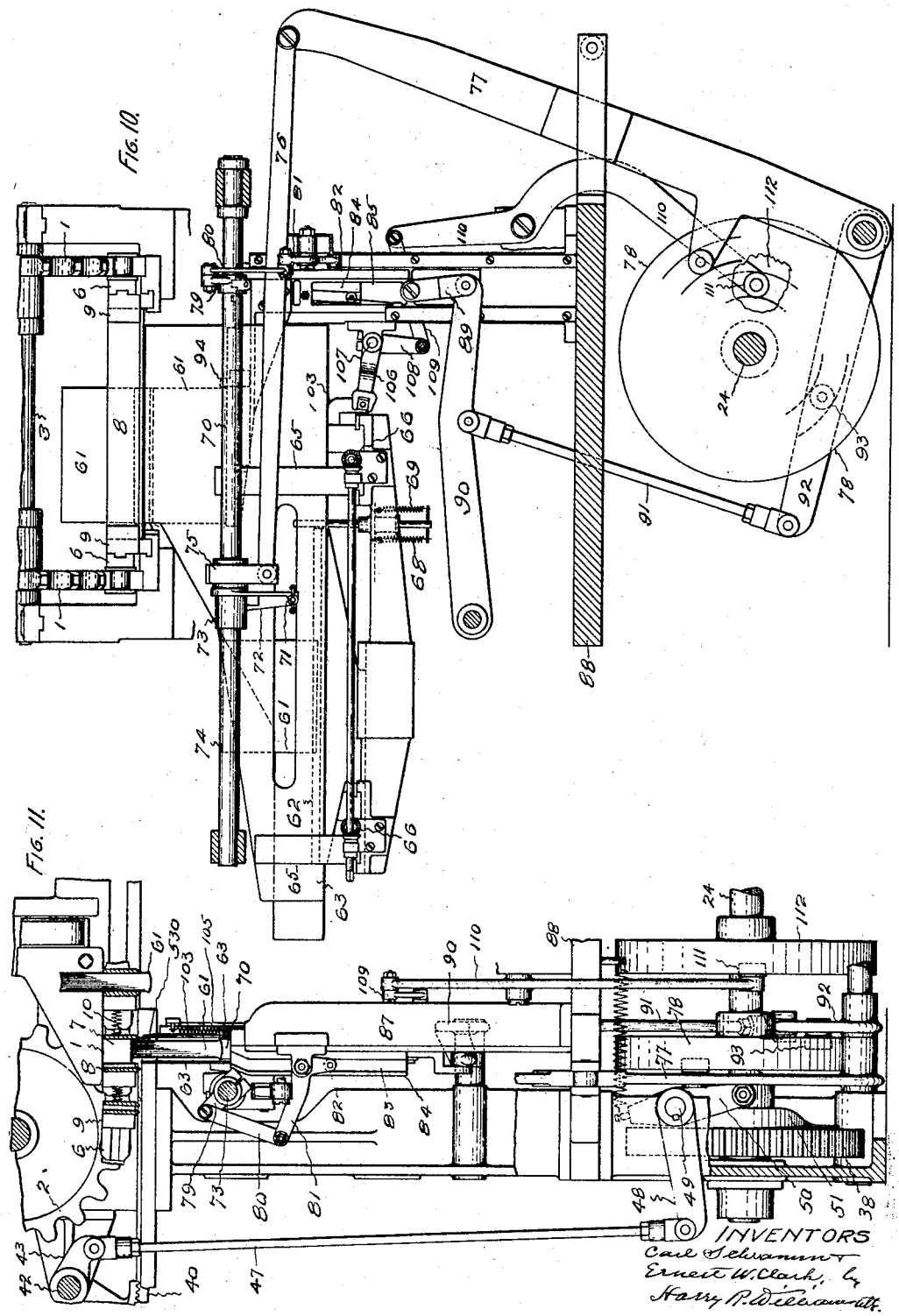

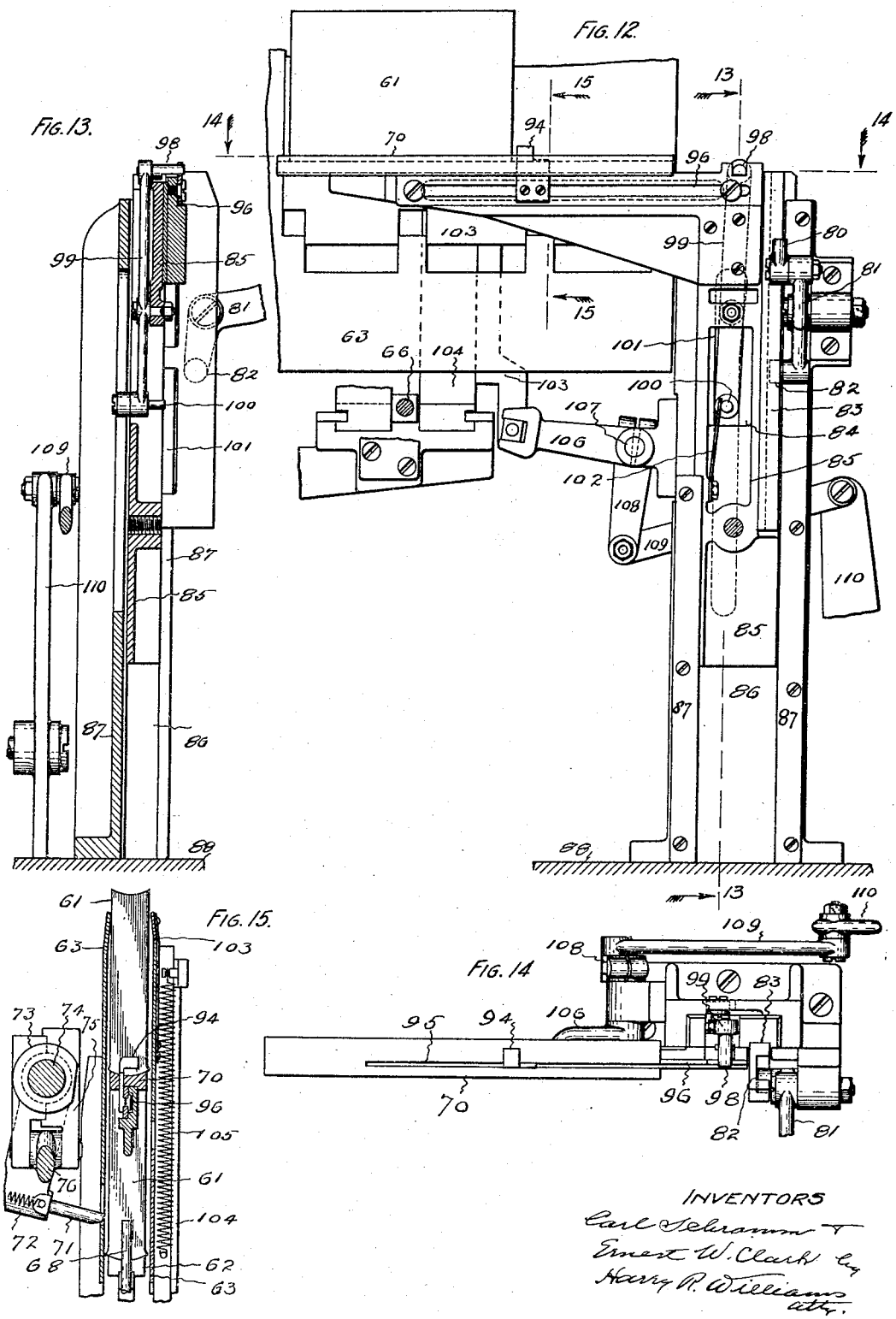

Sept. 22, 1931.     C. SCHRAMM ET AL     1,824,506
MACHINE FOR BACK LINING BOOKS
Filed July 31, 1930     17 Sheets-Sheet 8
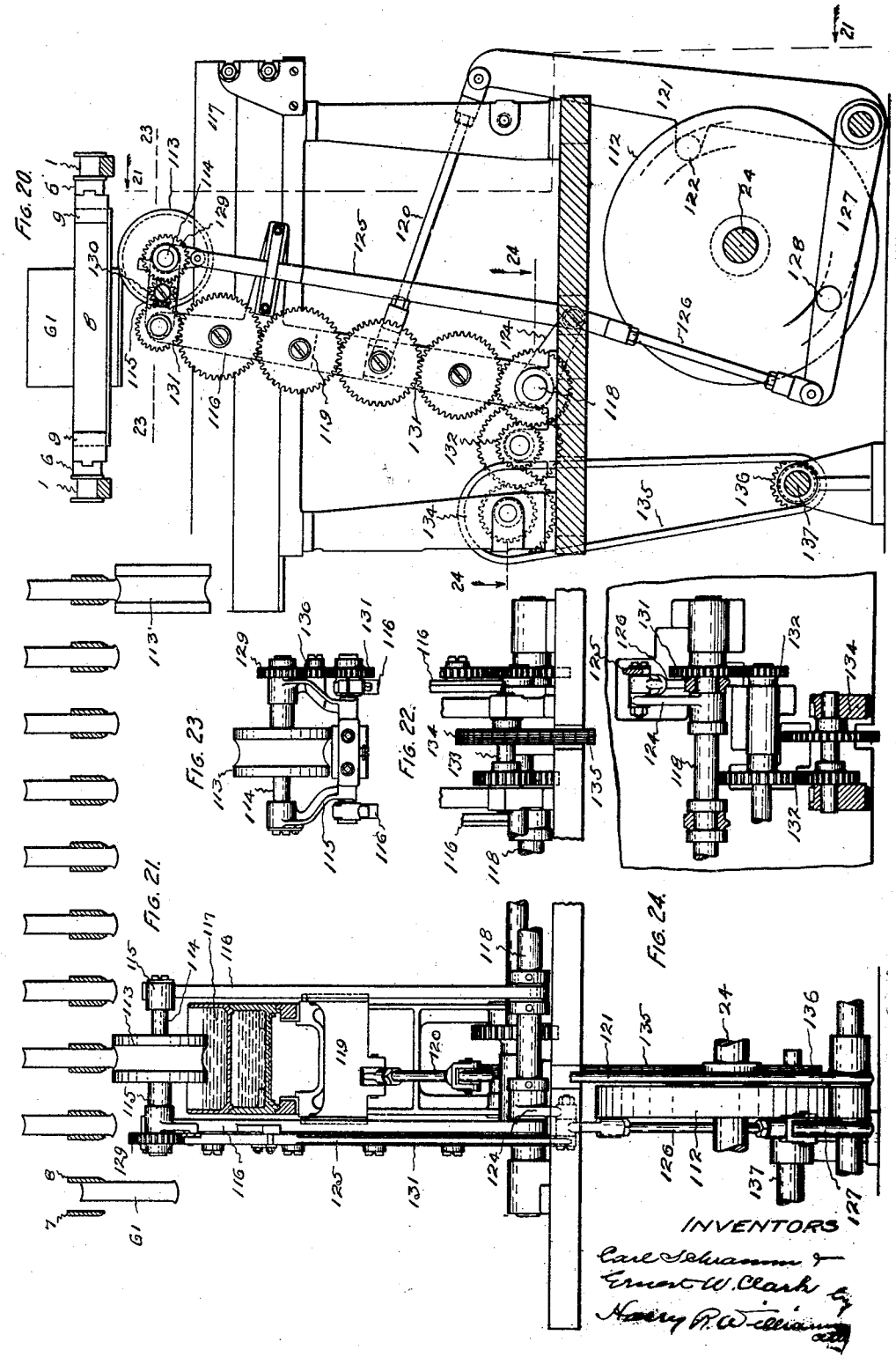

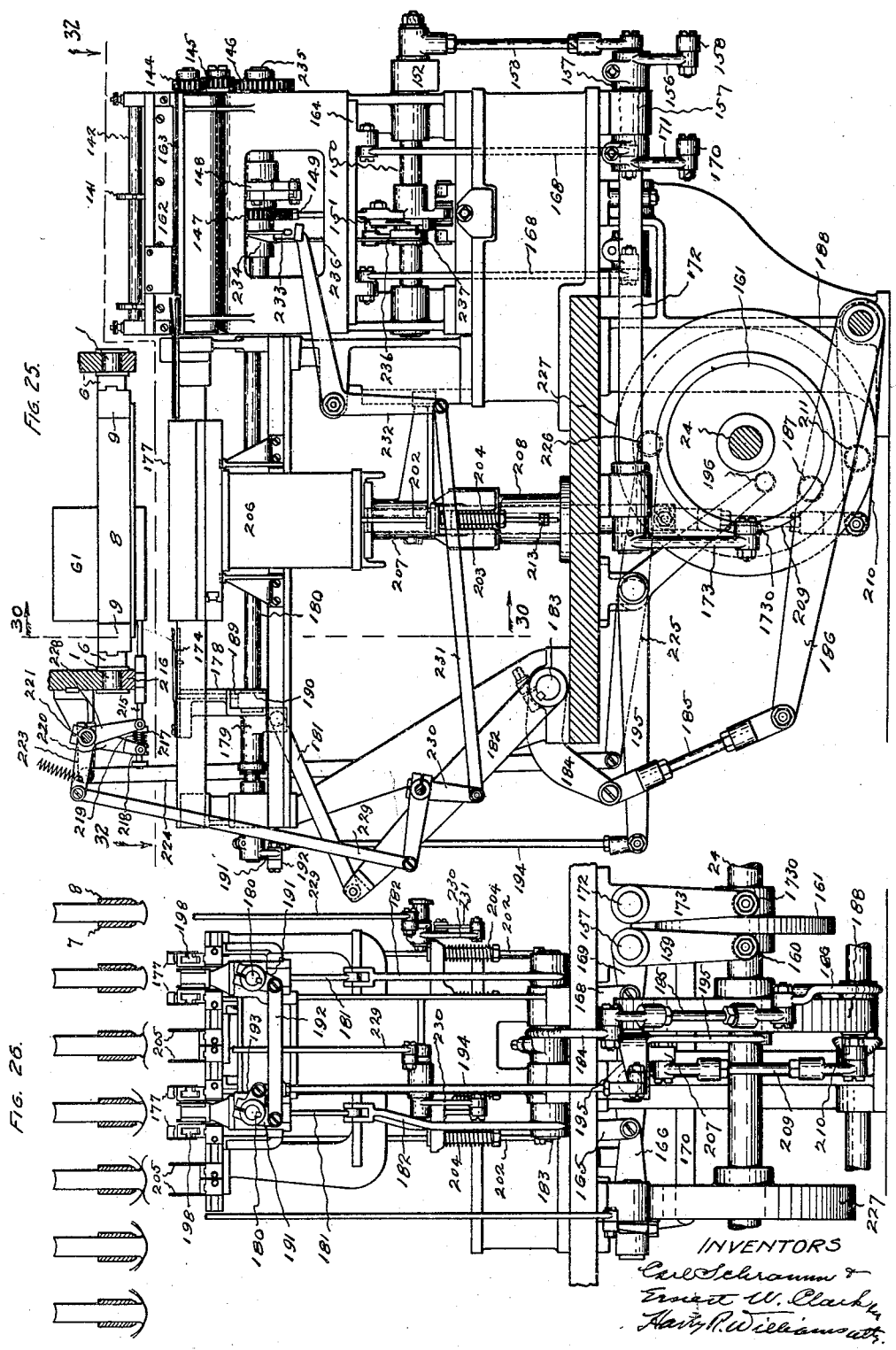

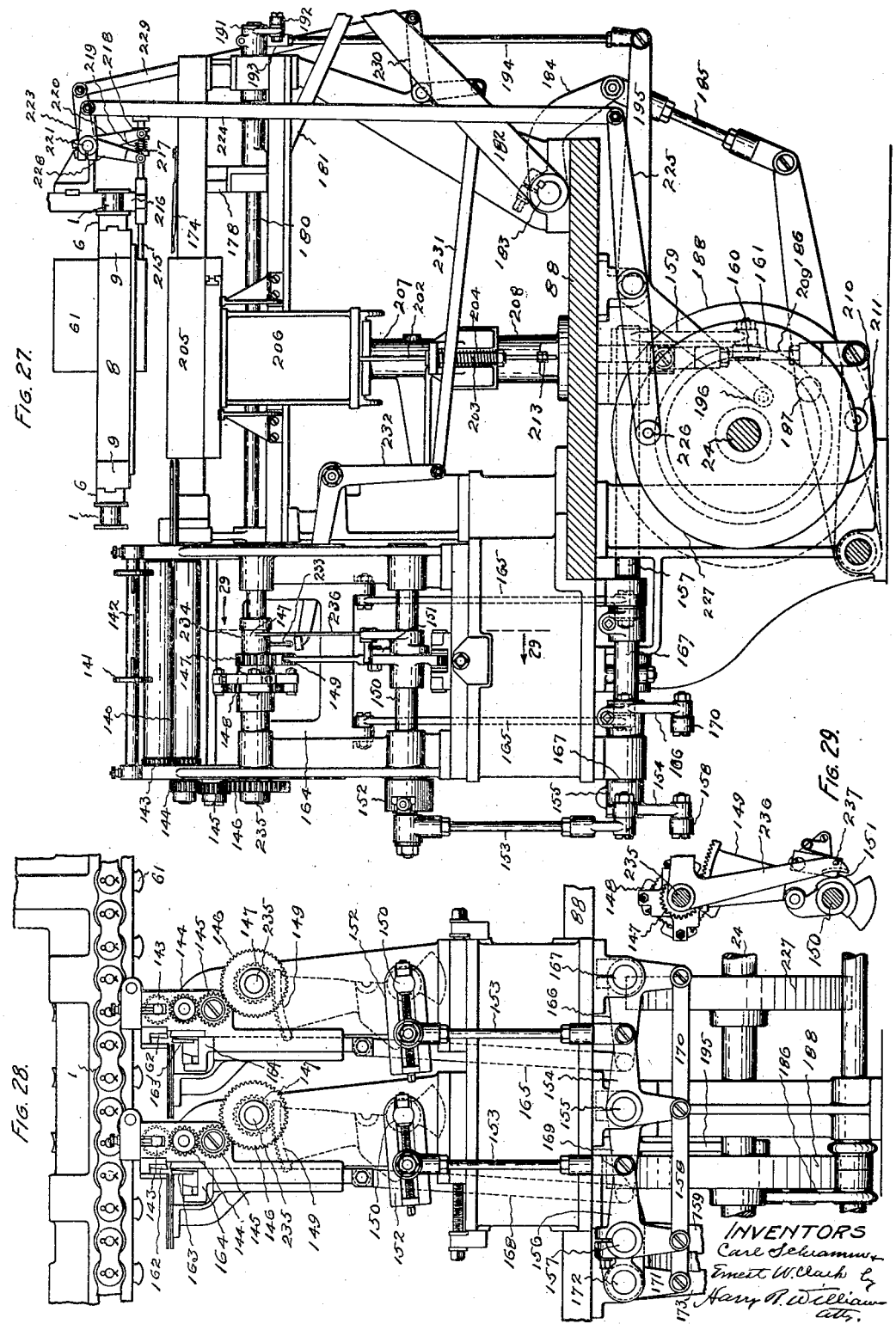

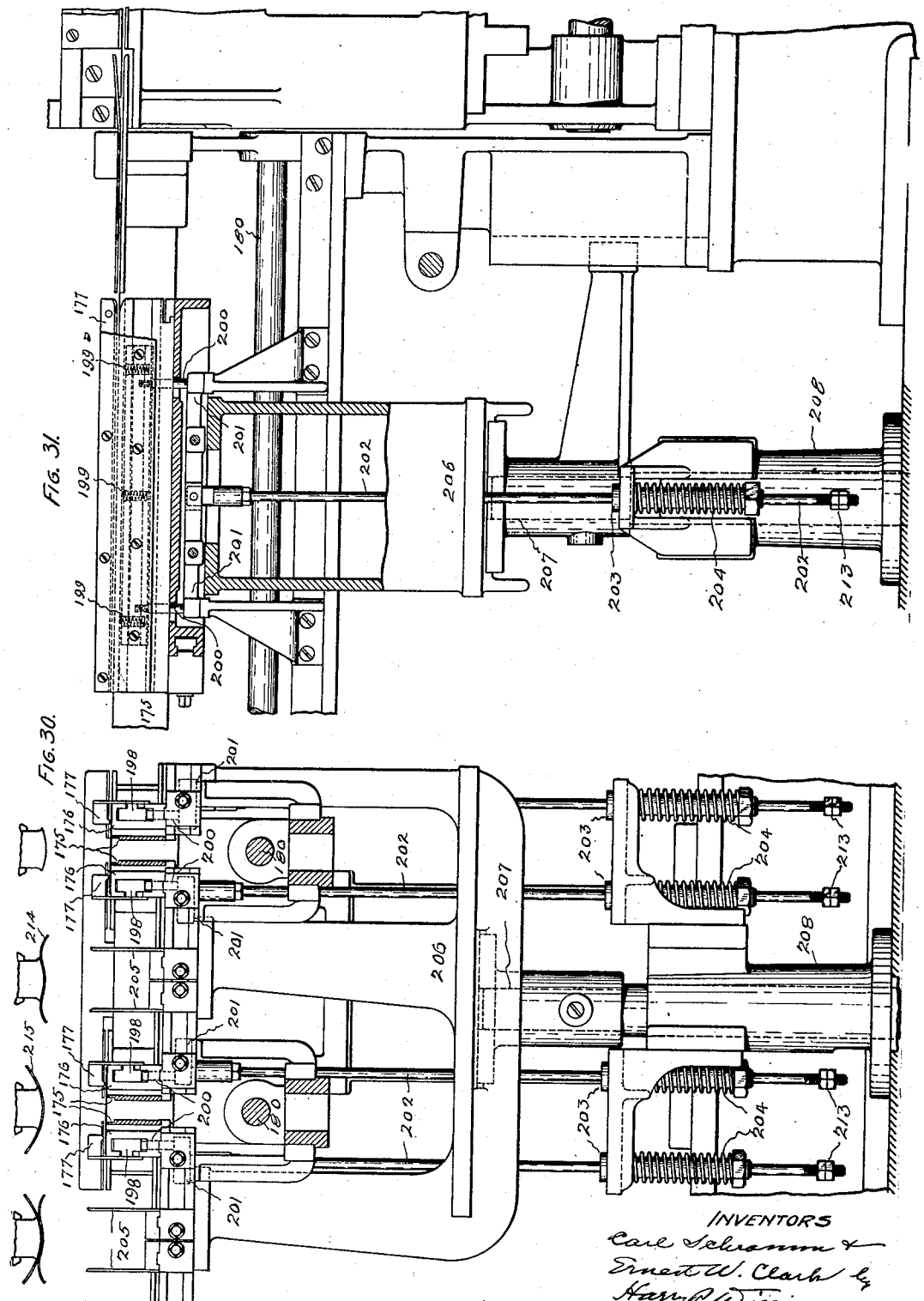

Sept. 22, 1931. C. SCHRAMM ET AL 1,824,506
MACHINE FOR BACK LINING BOOKS
Filed July 31, 1930 17 Sheets-Sheet 12
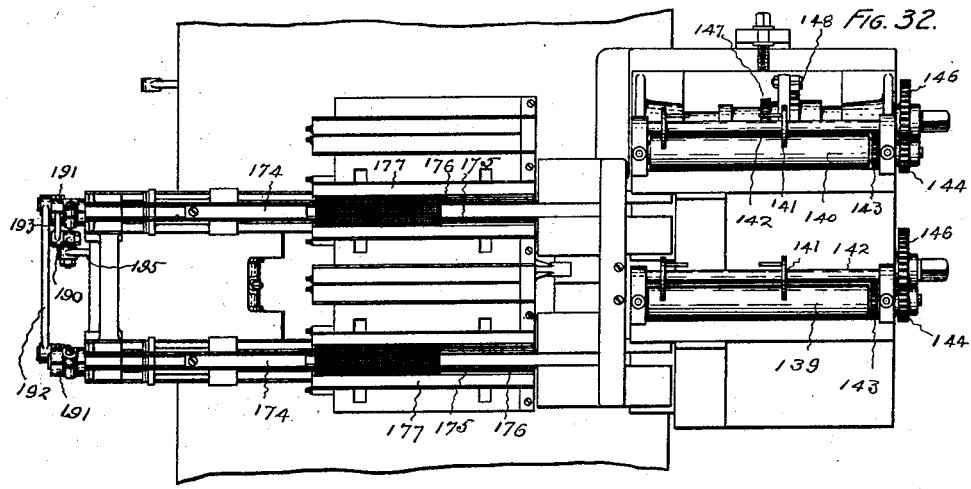
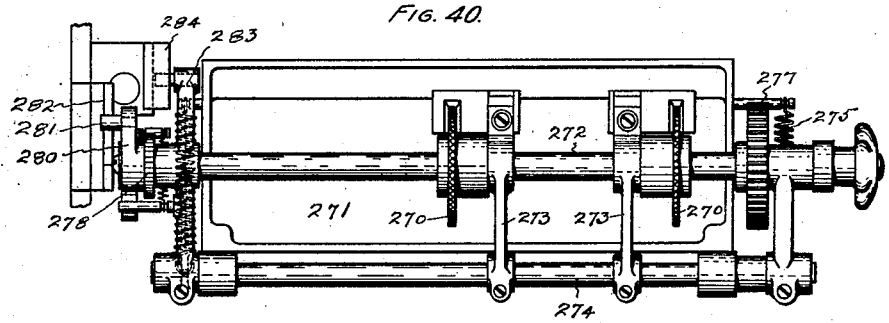
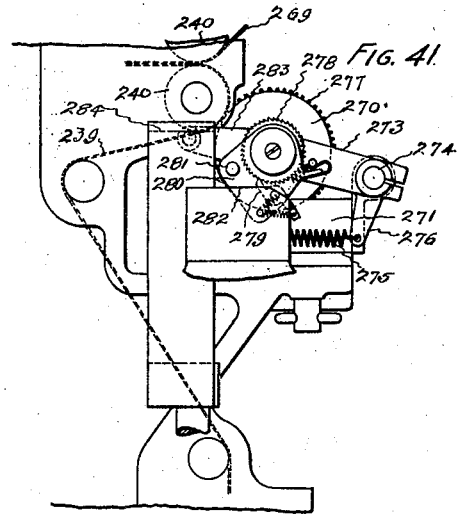
INVENTORS
Carl Schramm &
Ernest W. Clark by
Harry R. Williams
atty.

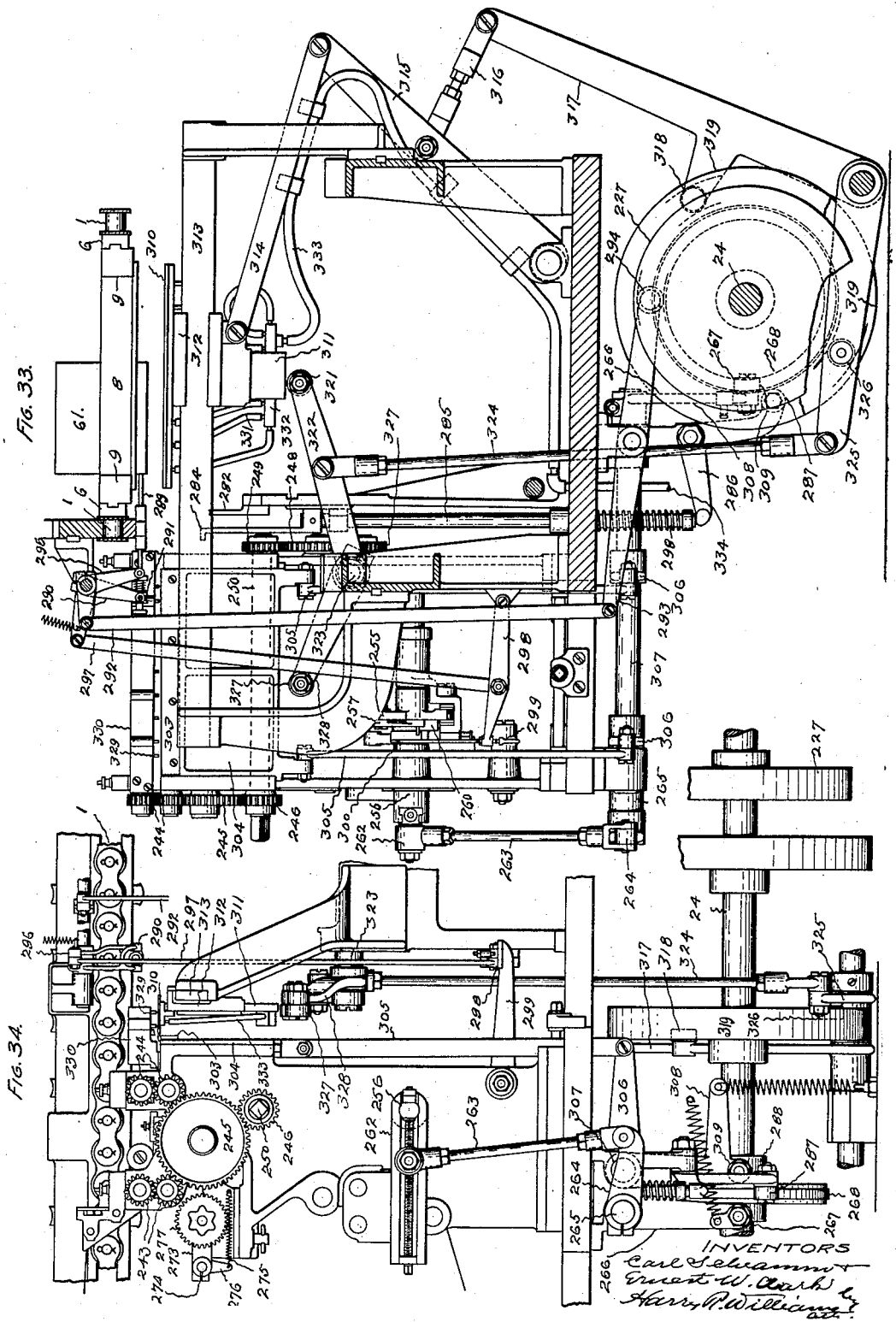

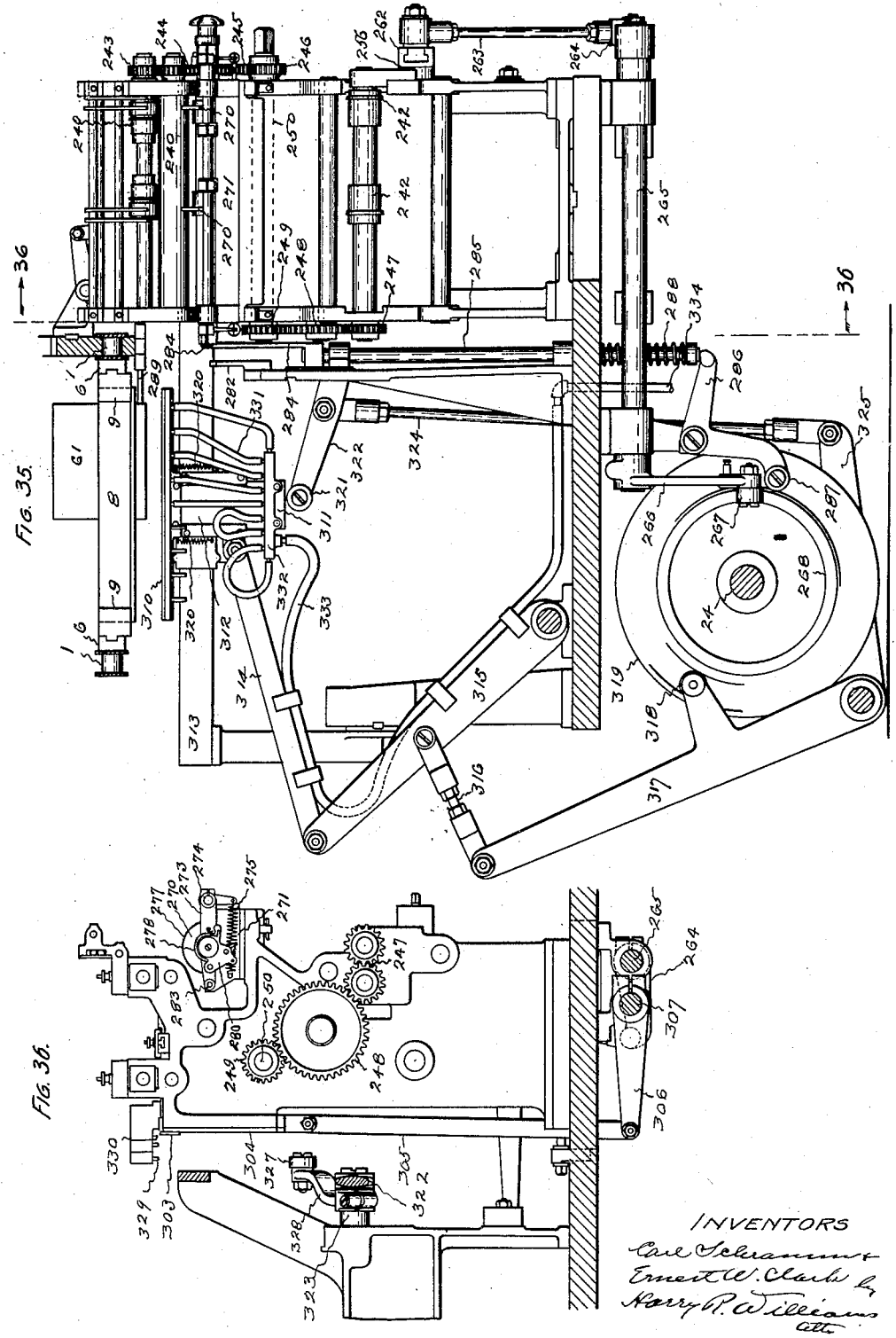

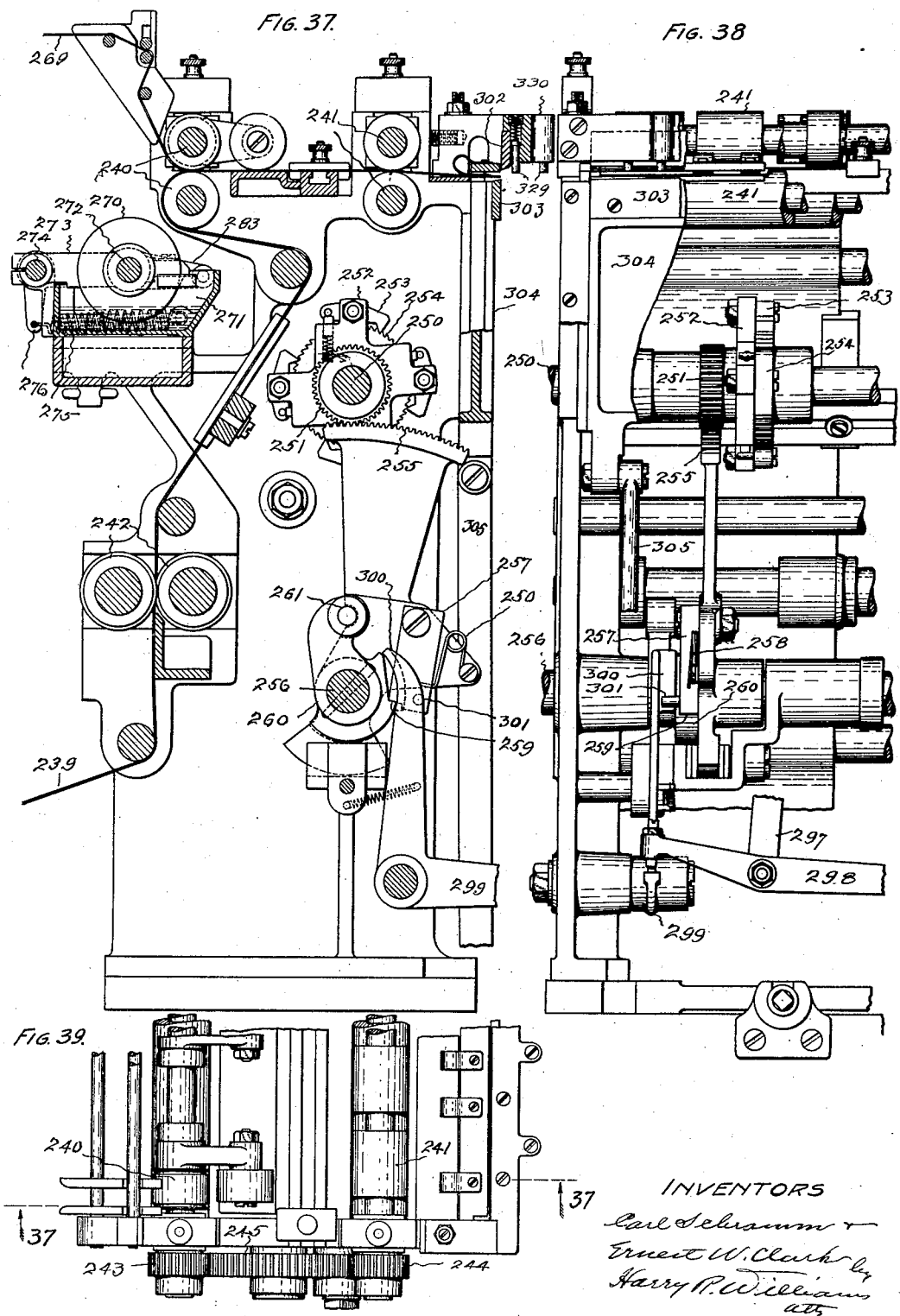

Sept. 22, 1931.   C. SCHRAMM ET AL   1,824,506
MACHINE FOR BACK LINING BOOKS
Filed July 31, 1930   17 Sheets-Sheet 16
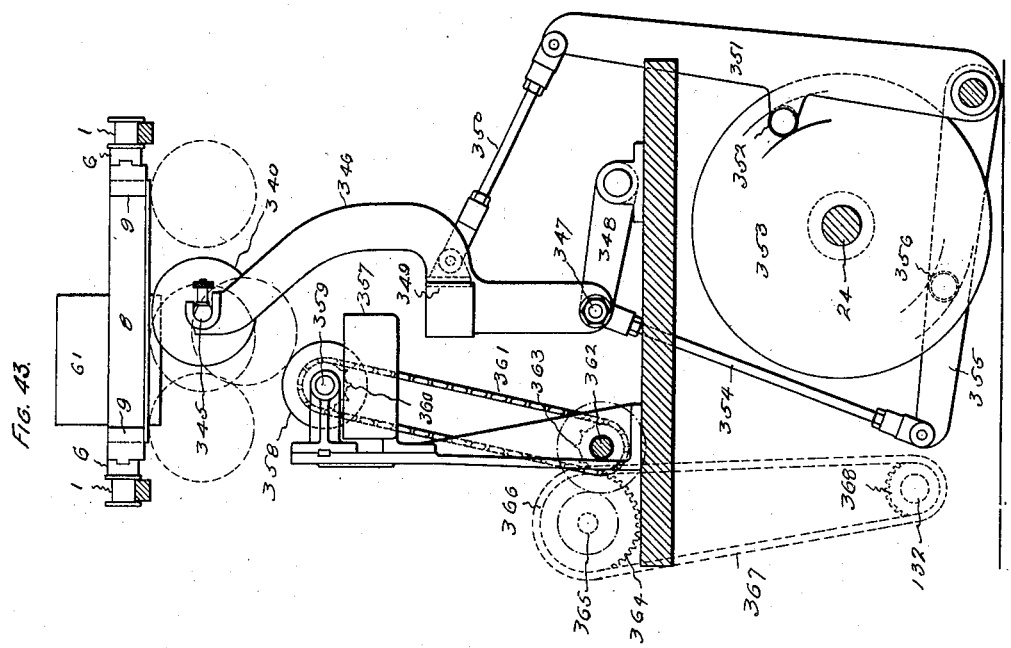
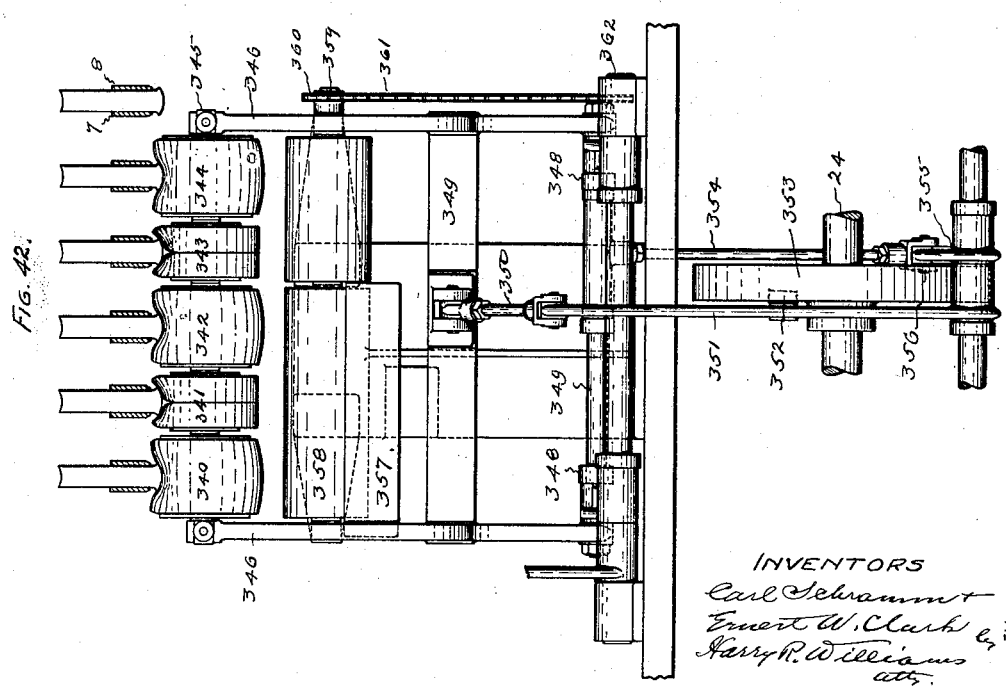

Sept. 22, 1931. C. SCHRAMM ET AL 1,824,506
MACHINE FOR BACK LINING BOOKS
Filed July 31, 1930 17 Sheets-Sheet 17
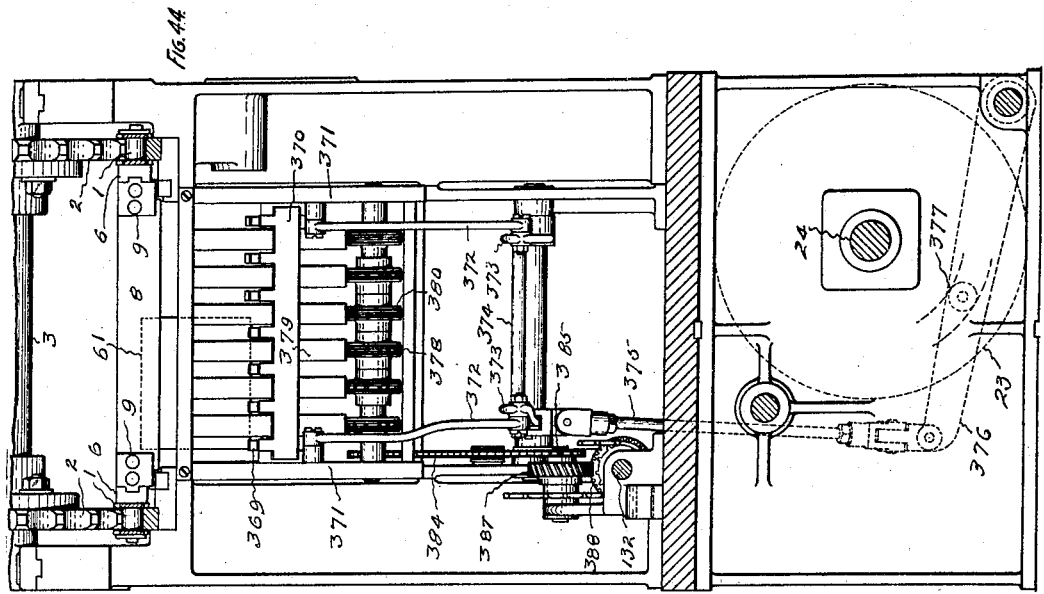
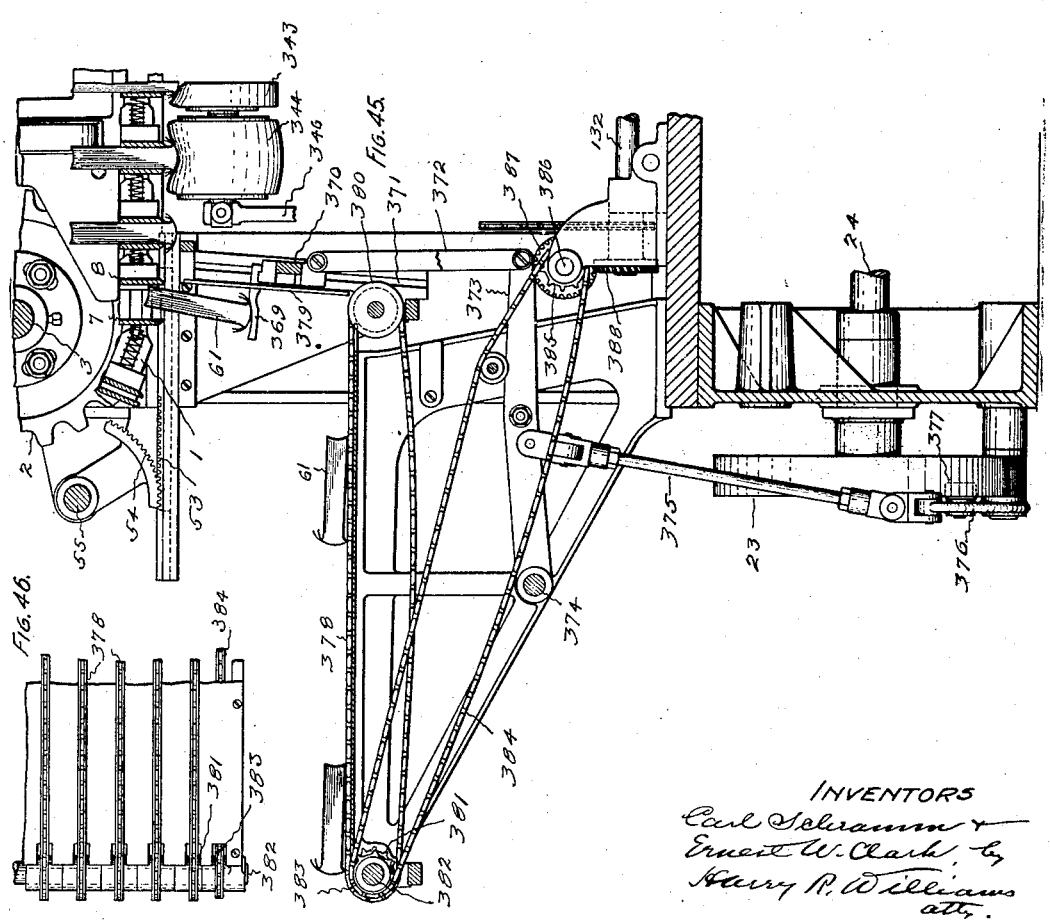
INVENTORS Patented Sept. 22, 1931

1,824,506

UNITED STATES PATENT OFFICE

CARL SCHRAMM, OF WEST HARTFORD, AND ERNEST WAYNE CLARK, OF HARTFORD, CONNECTICUT, ASSIGNORS TO THE SMYTH MANUFACTURING COMPANY, OF HARTFORD, CONNECTICUT, A CORPORATION OF CONNECTICUT

MACHINE FOR BACK LINING BOOKS

Application filed July 31, 1930. Serial No. 472,045.

Preliminary to putting the cases on the fillers in the process of binding books, crash reinforcements and paper back-linings are applied to the backs of the fillers. This invention relates to an automatic machine for applying the crash and the back-linings to fillers.

The object of the invention is to provide an automatic machine which will rapidly, accurately and smoothly apply crash and back-linings, and if desired head bands, to fillers, the operating mechanisms being so designed and co-ordinated, and the manner of feeding the fillers being so arranged that the machine while acting upon a large number of fillers simultaneously occupies a relatively small floor space.

In the machine illustrated the fillers are loaded in succession back down in a runway near one end of the front of the machine and automatically pushed onto an elevator. The elevator lifts the fillers into clamps attached to an endless chain and are carried thereby with an intermittent movement from station to station across the machine near the top. Means are provided to prevent the insertion of a filler when the elevator is lifted and also to accurately locate the fillers on the elevator.

At the first station a filler is pushed onto the elevator and is lifted into the clamp and the jaws closed. At the second station nothing is done to the filler. At the third station adhesive is applied by a roll that is swung up and rolled across the back of the filler. At the fourth station nothing is applied to the filler but it is engaged by a trip that sets in operation the crash feeding mechanism. If there is no filler at this station crash will not be fed at the next station. At the fifth station a length of crash which has been cut off from a roll and fed in is lifted and applied to the adhesive coated back of the filler. At the sixth station plates move up and stretch the crash over the back of the filler. At this station the filler trips the mechanism for cutting off and feeding a second strip of crash. At the seventh station the second strip of crash is applied to the back of the filler. At the eighth station plates rise and stretch the second strip of crash over the back of the filler. The two crash feeding mechanisms are similar as are the two crash stretching mechanisms. At the ninth station the interval is utilized to allow the adhesive to set and the crash strips to become fixed. At the tenth station another application of adhesive is made to the crash on the back of the filler by a roll that is swung up and rotated across the back of the filler. The two adhesive applying mechanisms are similar. At the eleventh station nothing is done to the filler, but the filler operates a trip which releases mechanism for cutting off and feeding in a strip of paper back-lining and head bands. At the twelfth station the back-lining and head bands are applied to the back of the filler. At the thirteenth station the back-lining is pressed to place by a roll which comes up near the middle of the filler and rolls first one way and then the other. At the fourteenth station rolls rub the back-lining about the edges of the back of the filler. At the fifteenth station a roll again rolls over the back-lining. These rubbing rolls turn in tanks containing water so that they apply a little moisture to the back-lining. At the sixteenth station dry rolls run along the edges of the back of the filler. At the seventeenth station a dry roll again runs over the back. These wet and dry rolls are elastic, preferably pneumatic rolls, and they first engage the filler near the middle of its length and roll one way and then the other way so that they will not slip the back-lining and crash from position. At the eighteenth station nothing is done, the interval being utilized to allow the moisture to dry and the adhesive to set. At the nineteenth station the clamp is opened and the filler with the crash, back-lining and head bands is discharged to an elevator which lowers the filler onto a delivery chain. The several stations are indicated in Fig. 5 of the drawings.

Electrical means are arranged for heating the adhesive tanks. There is a motor driven vacuum pump piped to the back-lining applying means for retaining back-lining strips on their conveyers until they are about to be applied to the fillers.

As the fillers are fed in and carried edgewise in a vertical position side by side from station to station the distance between stations is very short and the total travel is reduced to a minimum so that while simultaneously operating upon a large number of fillers regardless of their size, the machine is very compact and occupies but a relatively small floor space.

Figure 17:
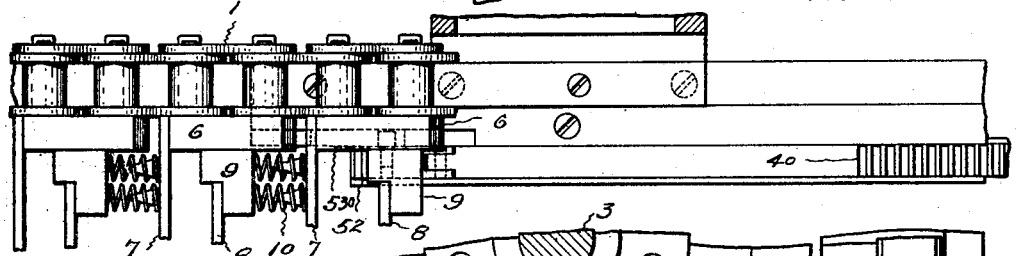
Figure 18:
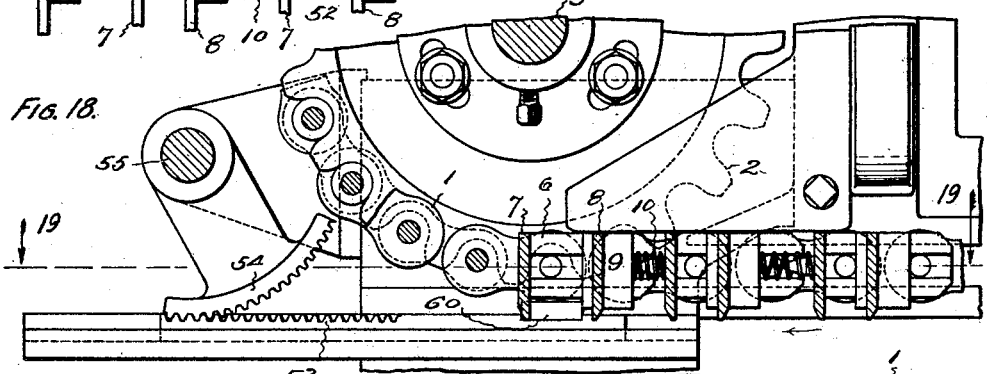
Figure 19:
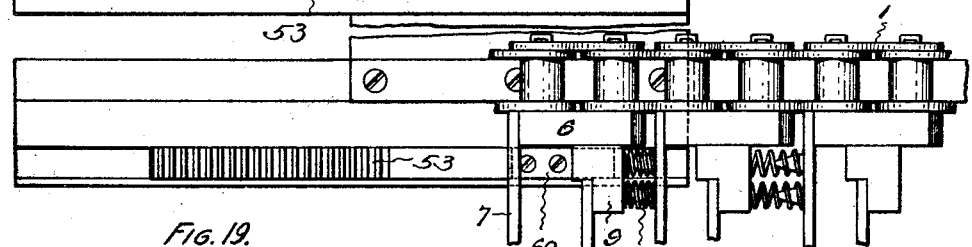

In the accompanying drawings Fig. 1 is a general elevation looking toward the back of the machine with portions omitted for the sake of clearness. Fig. 2 is a front elevation showing the drive mechanism. Fig. 3 is an end elevation of the chain drive mechanism. Fig. 4 is a plan of the conveyer chain indexing mechanism. Fig. 5 is a section taken through the conveyer chain and indicating the several stations and what means are applied to the fillers at these stations. Fig. 6 is a section of the conveyer chain on plane indicated by dotted line 6—6 on Fig. 5. Fig. 7 is a vertical section taken across the machine at substantially the first station, showing in side view the loading and elevating mechanisms. Fig. 8 is a view looking toward the right hand end of the mechanism shown in Fig. 7. Fig. 9 is a plan of the loading runway which is shown in side elevation immediately below. Fig. 10 shows an elevation of the loading and elevating mechanism looking at the opposite side from that shown in Fig. 7. Fig. 11 is an elevation looking from the right hand end of Fig. 10. Fig. 12 shows a side elevation on larger scale of the elevator mechanism. Fig. 13 is a section on the plane indicated by the dotted line 13—13 on Fig. 12. Fig. 14 is a section on the plane indicated by the dotted line 14—14 on Fig. 12. Fig. 15 is a section on the plane denoted by the dotted line 15—15 on Fig. 12. Fig. 16 is an elevation showing the means for opening the clamp jaws at the loading end of the machine. Fig. 17 is a plan of the portion of the chain and jaw opening bar shown in Fig. 16. Fig. 18 is an elevation showing the means for opening the clamp jaws at the discharge end of the machine. Fig. 19 is a plan of the portion of the chain and jaw opening bar shown in Fig. 18. Fig. 20 is a transverse vertical section showing an elevation of the adhesive applying mechanism, which is the same at both adhesive applying stations. Fig. 21 is an elevation of the adhesive applying mechanism with parts in section on the dotted line 21—21 on Fig. 20, this figure also indicating the relative positions of the two adhesive applying mechanisms to the filler stations. Fig. 22 is a side view of some of the connecting gears shown in Fig. 20. Fig. 23 is a plan looking down from dotted line 23—23 on Fig. 20. Fig. 24 is a horizontal section on the dotted line 24—24 of Fig. 20. Fig. 25 shows a side elevation of the crash feeding and applying mechanisms, which are the same at the two crash applying stations. Fig. 26 is an elevation looking toward the left hand side of the mechanism shown in Fig. 25, this view indicating the relations of the crash applying element to the fillers. Fig. 27 is an elevation of the crash mechanism looking from the side opposite to that shown in Fig. 25. Fig. 28 is an elevation looking toward the left hand side of Fig. 27. Fig. 29 shows a detail of the crash feed trip mechanism, the section being on dotted line 29—29 on Fig. 27. Fig. 30 is a side elevation, on larger scale, with the parts in section, of a portion of the crash lifting mechanism. Fig. 31 is a view looking toward the right hand side of Fig. 30, with parts in section. Fig. 32 is a view looking down from the dotted line 32—32 on Fig. 25. Fig. 33 is a vertical transverse section taken across the machine and showing the back-lining operating mechanisms. Fig. 34 is a view looking toward the left hand side of Fig. 33. Fig. 35 is a view similar to Fig. 33 but looking from the opposite side. Fig. 36 is a section on the dotted line 36—36 on Fig. 35. Fig. 37 is a vertical section through the back-lining and head band feed mechanisms taken on the dotted line 37—37 on Fig. 39. Fig. 38 is a view of the back-lining feed mechanism looking toward the right hand side of Fig. 37. Fig. 39 is a view looking down on Fig. 37. Fig. 40 is a view looking down into the tank which supplies adhesive to the back-lining for the purpose of securing the head bands thereto. Fig. 41 is a view looking toward the left hand side of Fig. 40. Fig. 42 is an elevation looking toward the rolls that rub the crash and back-lining onto the fillers. Fig. 43 is a view illustrating the action of the rubbing rolls. Fig. 44 is a transverse section taken across the machine at the discharge station. Fig. 45 is a longitudinal section taken at the discharge station. Fig. 46 is a detail plan of the delivery chain.

The filler conveyer comprises two endless roller chains 1 that extend around sprockets 2 fastened to shafts 3 that are rotatable in bearing brackets 4 at the ends of the top of the frame 5, Figs. 1, 2. The inside links of these chains are in the form of blocks 6 and fastened to one end of each block and extending across from chain to chain are plates which form the fixed clamp jaws 7, Fig. 6. The movable clamp jaws 8 are fastened to blocks 9 that have tenons movably fitting in grooves in the faces of the blocks 6. Springs 10 between the fixed jaws and the blocks 9 normally force the movable jaws toward the fixed jaws, Figs. 16–19.

Loose on the shaft 3 at the discharge end of the machine is a gear 11, the hub of which is adjustably connected by bolts 12 and worm 13 with a toothed disk 14 that is fastened to the shaft, Figs. 1, 3. By this means the gear 11 may be angularly adjusted with relation to the conveyer sprockets. Engaging the gear 11 is a toothed segment 15 that extends from a collar 16 which is splined on a sleeve 17 that is rotatable on an arbor 18 which projects from the frame, Fig. 3. The sleeve has a rocker arm 19 that is connected by a link 20 with a lever 21 which has a roll 22 that runs in a cam groove in a face of the disk 23 that is fastened to the cam shaft 24, Figs. 1, 3. The collar 16 has a groove engaged by a yoke 25 at the upper end of an angle lever 26 that is connected by a link 27 with a lever 28 which has a roll 29 running in a cam groove in a face of the disk 30 fastened to the cam shaft, Figs. 1, 3. The cams are so timed that the segment 15 is oscillated to impart a rotary movement to the gear 11 and then slide sidewise out of engagement with the gear and swing back and forth again transversely into engagement with the gear, and thus through the gear impart intermittent movements to the conveyer and carry the fillers from station to station. To prevent accidental movement of the conveyer and dislocation of the fillers carried by the conveyer, a toothed latch 31 is arranged to engage the teeth of the gear, while the segment 15 is disengaged from the gear 11. This latch is movable in a bracket 32 and has a stud 33 which is engaged by the forked end of an angle lever 34 that is connected by a link 35 with a lever 36 controlled by a cam groove in a face of the disk 30, Fig. 1. This cam is timed to cause the latch to engage the gear just before the segment is slipped out and hold the gear until the segment is again engaged with the gear. The cam shaft has a gear 37 that is connected by suitable gears 38 with a driving pulley 39, Fig. 2.

The clamps are normally closed by the springs 10 and they are opened at the loading station for receiving fillers, then closed and again opened at the discharge station for delivering the fillers. Slidable horizontally in ways in the frame beneath the conveyer chains at the loading end, are bars 40 that at their outer ends have teeth which are engaged by toothed segments 41 fastened to shaft 42 that extends across the frame, Figs. 1, 2, 3. A rocker arm 43 is adjustably connected with the shaft 42 by means of a toothed disk 44, worm 45 and bolts 46, Fig. 1. The arm 43 is connected by link 47 with a rocker arm 48 on an arbor 49 that has a rocker arm 50 which is controlled by cam 51 on the cam shaft, Figs. 1, 11. Pivoted to the inner ends of the bars 40 are latches 52 that, when the bars are pushed in by the segments drop down the inclines 530 at the bottom of the bar runways, out of the path of the clamps, and that when the bars are drawn out by the segments ride up the inclines and engage the blocks 9 and pull the movable clamp jaw open, as illustrated in Figs. 16 and 17. The cam 51 is timed so that the latch bars will pull open a clamp jaw just before it reaches a position to receive a filler from the elevator, and to release it and allow the springs to close the clamp after it has received a filler. By adjusting the angular position of the rocker arm 43 on the shaft 42, by turning the worm 45, the distance of opening of the clamps may be regulated for fillers of different thicknesses.

At the discharge end of the machine the sliding rack bars 53 are engaged by toothed segments 54 on a shaft 55 which has a rocker arm 56 that is connected by a link 57 with a lever 58 which is controlled by a cam on the face of the disk 59 on the cam shaft, Fig. 1. By these means the bars 53 are pushed in at the proper time so that the blocks 60 which they carry will engage with the blocks 9 that carry a movable clamp jaw and open the clamp and release the filler held thereby, Figs. 18, 19. After the filler has been released the bars 53 are withdrawn and allow the clamp to close.

The mechanisms for loading the fillers and elevating them to the conveyer clamps are shown in Figs. 7–15. The fillers 61 are placed by hand back down on a fixed horizontal runway 62 between vertical side walls 63, that are supported by a bracket 64 fastened to the frame of the machine. The walls 63 are adjustable toward and from each other for different thicknesses of fillers, being fastened to blocks 65 that may be moved transversely on the bracket by means of right and left threaded screws 66, Figs. 7–9. On one wall is a spring latch 67 for positioning the fillers, which are pushed in past the latch and then drawn back against it, Fig. 9. At the inner end of the runway there is a stop pin 68 normally held raised by springs 69, Fig. 7, to prevent fillers from being pushed in beneath the raised elevator and becoming jammed when the elevator comes down. The fillers are fed from this position onto the elevator 70 by a spring finger 71 carried by an arm 72 that projects from a sleeve 73 which is free to move along but rotates with a shaft 74, Figs. 8, 10, 15. An arm 75 which engages the sleeve 73 is connected by a link 76 with a lever 77 that is actuated by a cam groove in a disk 78 on the cam shaft. By this mechanism the finger is moved back and forth for feeding the fillers from the runway onto the elevator.

The shaft 74 has an arm 79 which is connected by a link 80 with a lever 81 that has a roll 82 in a vertical cam groove 83 in a plate 84, Figs. 10, 11. The plate 84 is fastened to the slide 85 that is movable up and down the frame, and to which the elevator 70 is fastened, Figs. 10, 12. As the elevator nears its lower position this cam groove 83 causes the shaft 74 to turn the finger 71 in back of a filler. The filler is then pushed by the finger onto the elevator, and as the elevator rises the finger is turned out and carried back for another filler.

The slide 85 to which the elevator 70 is attached is movable up and down in a track 86 in the pillar 87 on the top of the bed 88, Figs. 1, 10, 12. A link 89 connects the slide with a lever 90 that by a link 91 is connected with a lever 92 which has a roll 93 in a cam groove in a face of the disk 78 on the cam shaft, Fig. 10.

The filler is fed onto the elevator rather close to a stop 94, Fig. 12, which as the elevator approaches its upper position is moved against the edge of the filler and pushes it back into exact position. This stop extends through a slot 95 in the top of the elevator, being carried by a slide 96 movable in a groove in the elevator arm 97, Figs. 12, 14, 15. The upper edge of this slide 96 is notched and is engaged by a pin 98 in the upper end of a lever 99 which is pivoted to and carried up and down by the elevator slide 85, Figs. 12, 13. The lower end of the lever 99 has a pin 100, which travels in a cam groove 101 in the fixed supporting pillar 87, and is pressed against one side of the groove by a spring 102, Fig. 12. As the elevator approaches its upper position and is lifting a filler into the jaws of a conveyer clamp this pin is pressed by the spring so the lever 99 will move the stop against the edge of the filler and push it into its position before the clamp is closed. When the elevator starts down after leaving a filler in the clamp the cam groove 101 acting on the pin 100, causes the lever 99 to draw back the stop.

To hold the leaves of the filler together as it is elevated, so that they will pass properly between the jaws of the clamp, one of the walls 63 of the loading runway is fixed, while the other has a section 103, Figs. 7, 12, that is vertically movable on the track 104 attached to the fixed section of the wall. This movable section of the wall is normally lifted by springs 105, Figs. 7, 15. After the edge of the filler is between the clamp jaws, the wall section 103 is drawn down by a rocker arm 106 on a shaft 107 that has a rocker arm 108 which is connected by a link 109 with a lever 110 that has a roll 111 running in a cam groove in a face of the cam disk 112 on the cam shaft, Figs. 7, 11. This mechanism draws the runway wall down out of the way after the free edges of the filler are between the clamp jaws, so that it will not obstruct the movement of the filler as it is carried along by the conveyer chain.

The conveyer carries the fillers from the loading station, which has just been described, to the second station at which nothing is applied to the filler backs, and then to the third station at which adhesive is applied to the backs by a roll 113. At the tenth station, as before mentioned, adhesive is again applied. The adhesive applying mechanisms being the same at the third and tenth stations, but one is illustrated, Figs. 20–24, and the following description will suffice for both.

The roll 113 has a periphery that conforms to the curved back of the filler, and is fastened on an arbor 114 mounted in a yoke 115, Fig. 23. The yoke is pivoted to the upper ends of levers 116 which extend on each side of the adhesive tanks 117 and are pivoted on a shaft 118, Figs. 20, 21. The levers 116 are joined by a cross block 119, Fig. 21, and this block is connected by a link 120 with a lever 121 that has a roll 122 in a cam groove in one face of the cam disk 112 on the cam shaft. By this means the adhesive roll 113 is moved back and forth across the back of a filler for applying adhesive thereto.

On the shaft 118 is an arm 124 and this arm is connected by a link 125 with the yoke 115, Fig. 20. A link 126 connects the link 125 and arm 124 with a lever 127 that has a roll 128 in a cam groove in a face of the disk 112 on the cam shaft. By this parallel motion connection the roll 113 is caused to travel in a horizontal plane as it is moved back and forth so that it will rub against the back of the filler uniformly.

On one end of the arbor 114 is a gear 129 that is connected by a gear 130 on the yoke, with a train of gears 131 on one of the levers 116, Fig. 20. This train of gears is driven by gears 132, Figs. 20, 24, from a shaft 133 which has a sprocket 134 that is connected by a chain 135 with a sprocket 136 on a shaft 137, Figs. 20, 22, 24. The shaft 137 is driven by the chain 138 from the shaft of the driving pulley 39, Fig. 2. This mechanism rotates the adhesive roll as it is moved back and forth across the backs of the fillers.

After adhesive is applied to the back of a filler at the third station the conveyer advances the filler to the fourth station at which nothing is done, and then to the fifth station at which a strip of crash is fed, cut off and applied, then to the sixth station at which the crash is stretched over the back of the filler, then to the seventh station at which another strip of crash is fed, cut off and applied, and then to the eighth station at which the latter strip of crash is stretched over the back of the filler. The crash feeding and cutting mechanisms at the two stations are similar, and the applying and stretching mechanisms at the two stations are similar and operate simultaneously on different fillers, and are illustrated in Figs. 25–32.

Strips of crash of a width of the length of the fillers are drawn into the machine by a pair of rolls 139 at the first crash station, and by a pair of rolls 140 at the second crash station, being guided by disks 141 on bars 142, Figs. 32, 27. The shafts of each pair or rolls are connected by gears 143 and the lower shaft of each pair has a gear 144 that is engaged by a gear 145 meshing with the gear 146, Figs. 27, 28. On the shaft 235 of each gear 146 is a gear 147 that is connected with the shaft by ratchet and pawl means 148, Figs. 25, 27. Each gear 147 is engaged by a toothed segment 149 mounted on a shaft 150 and connected therewith by ratchet and pawl means 151. On the end of each of the shafts 150 is a rocker arm 152 to which is adjustably connected the upper end of a link 153, Figs. 25, 27, 28. The lower end of one of the links 153 is connected with an angle lever 154 that turns loose on a shaft 155, and the lower end of the other link 153 is connected with an angle lever 156 that is fastened to a shaft 157. These angle levers are connected by a link 158, Figs. 1, 28. The shaft 157 has a rocker arm 159 with a roll 160 engaged by a cam on one face of the disk 161 on the cam shaft, Figs. 1, 25, 26, 27. By this means both pair of rolls 139, 140 are given intermittent rotary movements for drawing the strips of crash into the machine.

Fastened across the path of the crash strips adjacent to the feed rolls are cutter blades 162, and movable in relation thereto are cutter blades 163, Fig. 28. The blades 163 are attached to vertically movable slides 164, Figs. 27, 28. The lower ends of one pair of these slides are connected by links 165 with angle levers 166 that are loosely mounted on a shaft 167, and the lower ends of the other pair of slides are connected by links 168 with angle levers 169 that turn loosely on the shaft 155. The levers 166 and 169 are connected by a link 170 with a rocker arm 171 fixed to a shaft 172, Figs. 27, 28. The shaft 172 has a rocker arm 173 that has a roll 173o engaged with a cam on one face of the disk 161 on the cam shaft, Figs. 1, 25, 26. By this mechanism the movable cutter blades are caused to sever pieces of crash from the fed strips of a width somewhat greater than the thickness of the fillers.

As the pieces of crash are cut at each station they are grasped by spring fingers 174, Figs. 25, 27, 32, and drawn into the machine beneath the fillers. The crash is supported by plates 175 and their edges held to ledges 176 by gripper bars 177, Figs. 30, 31, 32. Each of these fingers is mounted on the upper end of an arm 178 which extends from a sleeve 179 that is movable along a rotatable shaft 180, Fig. 25. The sleeve 179 is connected by a link 181 with a rocker arm 182 on a shaft 183 that has a rocker arm 184 which by a link 185 is connected by a lever 186 that has a roll 187 in a cam groove in a face of the disk 188 on the cam shaft, Figs. 25, 26. The spring fingers 174 are normally closed and they are opened by means of pins 189 that are vertically movable in the arms 178, and are engaged by eccentric collars 190 rotatable with but longitudinally movable along the shafts 180, Fig. 25.

For rotating the shafts 180 at the proper times to open the fingers and allow them to close, arms 191 are fastened to the ends of the shafts and these arms are connected by a link 192. One of the shafts 180 has an arm 193 that is connected by a link 194 with a lever 195 that has a roll 196 in a cam groove in one face of the disk 188 on the cam shaft, Figs. 25, 26, 27. By these means the fingers 174 are moved over to the crash, allowed to close and grasp the crash moved back for drawing the crash in, and then opened for releasing the crash.

The gripper bars 177 which hold the edges of the crash down on the ledges 176 are fastened to slides 198 which are vertically movable in the crash supporting ledges, Fig. 30, and they are normally drawn down to hold the grippers in closed position by springs 199 between the slides and ledges, Fig. 31. Extending down from the slides 198 are studs 200 that are adapted to engage with the ends of levers 201. These levers are jointed together and to the upper end of rods 202 that extend down through sleeves 203 which are loose in the frame and are normally pulled down by springs 204, Figs. 30, 31.

Both pairs of crash supporting ledges 176 and the grippers 177, also both pairs of stretching plates 205, are mounted on top of a vertically movable frame 206, Fig. 30, so that these parts move up and down together. The bottom of this frame is attached to a plunger 207 that is movably fitted in a tubular column 208 fastened on the bed, Figs. 30, 31. The lower end of the plunger 207 is connected by a link 209 with a lever 210 that has a roll 211 in a cam groove in the disk 188 on the cam shaft, Figs. 25, 27.

When the ledges 176 are down the studs 200 engage the levers 201 and lift the grippers so that crash can be fed onto the ledges below the grippers, Figs. 30, 31. When the ledges rise the studs 200 move away from the levers 201 and allow the springs 199 to close the grippers so that they will tightly hold the edges of the crash. As the ledges reach their upper position and stretch the crash onto the backs of the fillers the nuts 213, Fig. 31, engage the ends of the sleeves 203 and hold the rods causing the levers 201 to again engage the studs 200 and lift the grippers so they will release the crash and leave it on the backs of the fillers as the ledges and grippers return to lower position.

After the first crash has been applied and a filler is conveyed to the next station, the crash is in substantially the position 214, Fig. 30. Then at this station the blades 205 stretch the crash around the filler to substantially the shape 215, Fig. 30. The second crash is applied and stretched in the same manner.

Should a filler fail to appear at the fourth station the mechanisms are tripped so that the crash will not be fed at the fifth station, and should no filler appear at the sixth station the mechanisms are tripped so that no crash will be fed at the second crash station. These tripping mechanisms are the same.

Each of these trips has a pin 215 loosely fitted in one of the track rails 216 on which the conveyer chain travels, Figs. 25, 27. Fastened to each pin is a collar 217 and loose on each pin is a collar 218. These collars are separated by a spring 219. Engaged with the loose collar 218 is a lever 220 that is fastened to a shaft 221. Extending from the shaft 221 is a rocker arm 223 that by a link 224 is connected with a lever 225 which has a roll 226 in a cam groove in one face of the disk 227 on the cam shaft, Fig. 27. In front of the fixed collar 217 is the forked end of an angle lever 228 that is loose on the shaft 221. The other end of this lever 228 is connected by a link 229 with an angle lever 230 which is connected by a link 231 with an angle lever 232, Fig. 25. The end of this lever 232 extends adjacent to an arm 233 that extends from the sleeve 234 which is loose on the shaft 235, Figs. 25, 27. The sleeve 234 carries a trip lever 236, the lower end of which is adapted to engage a pin 237 that extends from the pawl of the ratchet and pawl connection 151 between the lower end of the segment 149 and the shaft 150, Figs. 25, 29. If a filler is in the conveyer chain the pin 215 engages it and the lever 220, operated through the connections from the cam 227, merely compresses the spring 219. However, if no filler is presented and the pin 215 is free to move inward the lever 220, through the sleeve and spring, turns the lever 228 and, this through the connections mentioned, causes the trip lever 236 to engage the pin 237 and release the pawl of the mechanism 151 so that the shaft 150 will oscillate without moving the segment 149, and thus the feed of the crash will be interrupted. This interruption continues until a filler is presented opposite the pin 215.

After the second crash has been applied the fillers are conveyed to the ninth station at which nothing is done, and then to the tenth station at which a second application of adhesive is made by the roll 238, Fig. 21. As before mentioned, the mechanism for actuating this roll 238 being identical with that described for actuating the roll 113 and illustrated in Figs. 20–24, no further description is necessary. At the eleventh station nothing is done and at the twelfth station the back-lining and head bands are applied, these mechanisms being shown in Figs. 33–41.

A strip of paper 239 from which the back-linings are cut is drawn into the machine by a pair of rolls 240 and a pair of rolls 241, being pulled between a pair of trimming cutters 242, Fig. 37, which trim the edges of the strip to a width approximately equal to the length of the fillers.

The shafts of the feed rolls 240 have intermeshing gears 243 and the shafts of the feed rolls 241 have intermeshing gears 244, these pairs of gears engaging with a gear 245 which meshes with a gear 246, Figs. 34, 35. The shafts of the trimming cutters have intermeshing gears 247 that are engaged by a gear 248 which meshes with the gear 249, Figs. 35, 36. The gear 246 and the gear 249 are fastened on the opposite ends of the same shaft, 250, Fig. 35.

Loose on the shaft 250 is a gear 251 to which is attached a plate 252 bearing pawls 253 that engage a ratchet wheel 254 which is fastened to the shaft 250, Figs. 37, 38. Engaging the gear 251 is a toothed segment 255 loosely mounted on a shaft 256. On the segment is a pawl 257 that normally is held by a spring 258, in engagement with a shoulder 259 on a plate 260 that is fastened to the shaft 256. This plate has a stud 261 that engages with one edge of the segment, Figs. 37, 38. When the shaft 256 is oscillated the pawl 257 swings the segment in one direction and the stud 261 swings the segment in the opposite direction.

The end of the shaft 256 has a rocker arm 262 and adjustably connected with this arm is a link 263 which is jointed to a rocker arm 264 on a shaft 265 that has a rocker arm 266 provided with a roll 267 which engages a cam on the face of the disk 268 on the cam shaft, Figs. 33, 34, 35.

Cords or narrow strips of fabric 269, which are to form the head bands, are drawn into the machine by the feed rolls 240, 241, and applied to the edges of the back-lining strip 239, Fig. 37, which edges have been coated with adhesive by disks 270 that are turned in a tank 271 and lifted and rotated against the back-lining strip, Figs. 37, 40, 41.

The disks 270 are fastened to a shaft 272 that is rotatably mounted in arms 273 which are fastened to a shaft 274 supported by the tank 271, Figs. 37, 40, 41. A spring 275 connected between the tank and an arm 276 that extends from the shaft 274 tends to turn this shaft and lift the disks against the back-lining 239 as it passes around the lower of the feed rolls 240. Fastened to one end of the shaft 272 is a gear 277 and fastened to the other end of this shaft is a ratchet wheel 278, Fig. 40. Engaged with the ratchet wheel is a pawl 279 that is carried by a plate 280 which turns on the shaft 272. This plate 280 has a stud 281 that is adapted to contact with the upper edge of a fixed plate 282, Figs. 40, 41. For drawing the disks 270 down into the adhesive tank, an arm 283 extending from the shaft 272 is engaged by the hooked upper end of a vertically movable 284, Figs. 35, 40, 41. This plate is attached to the upper end of a rod 285, the lower end of which is engaged by an angle lever 286 that has a roll 287 engaged with a cam on the periphery of the disk 268. A spring 288 tends to draw the rod and hooked plate so that the disks will extend into the adhesive in the tank. As the disks are drawn down into the tank the stud 281 engages the plate 282 so that the pawl 279 and ratchet 278 will cause the disks to rotate in the tank and accumulate adhesive on their peripheries. As the cam causes the release of the disks in order that they may be swung up into contact with the back-lining, the gear 277 on the shaft 272 engages with the gear 243 on the lower of the feed roll shafts and the disks are rotated at substantially the same surface speed as the back-lining.

The back-lining and head band feed mechanism is controlled by a trip mechanism similar to the trips for the crash feeds. If there is a filler at the eleventh station, the one preceding the back-lining and head band station, the pin 289 engages with the filler and the angle lever 290 merely compresses the spring 291, as it is oscillated by the link 292 that is connected with the lever 293 which has a roll 294 in a groove in the cam disk 227, Fig. 33. Should there be no filler at the eleventh station the pin 289 is free and then the lever 290 through the spring pushes the lever 296 that is connected by the link 297 with a lever 298 so that the lever 298 will engage with one end of an angle lever 299. The other end of the lever 299 has a lug 300 which, under these conditions, will engage the pin 301 which projects from the pawl 257 and pull the pawl 257 from the shoulder 259 so that the oscillation of the shaft 256 will not be transmitted to the feed segment 255, Figs. 33, 37, 38, and the feed of the back-lining and head bands will be interrupted.

As the back-lining with the applied head bands is advanced a distance equal to the thickness of a filler a piece is cut off by the fixed knife 302 and the movable knife 303, Fig. 37. This movable knife is carried on a slide 304 which is connected by links 305 with arms 306 that extend from a shaft 307 which has a rocker arm 308 with a roll 309 that engages with a cam on a face of the cam disk 268, Figs. 33, 34.

The severed piece of back-lining is left on top of a table 310 to which it is held by air suction, and which carries it beneath and then lifts it against the back of a filler, at which time the suction is relieved. The table is mounted on the top of a vertically movable slide 311 that is carried by a slide 312 which is movable horizontally on the bar 313, Figs. 33, 35. The slide 312 is connected by a link 314 with a lever 315 that by a link 316 is connected with a lever 317 which has a roll 318 in a cam groove in a face of the disk 319 on the cam shaft, Figs. 33, 35. This mechanism reciprocates the table horizontally for carrying the head bands with the back-linings beneath the fillers.

Springs 320, Fig. 35, connected between the slides 311 and 312, normally hold the table down. When the table is beneath a filler the slide 311 is engaged and lifted for applying the back-lining to the filler, by a roll 321 on a lever 322 that is fixed to the shaft 323 and that is connected by a link 324 with a lever 325 which has a roll 326 in a cam groove in one face of the disk 319, Fig. 33. When the table is out and in line with the feed rolls and cutters, the slide 311 is engaged by a roll 327 at the end of a lever 328 that is fastened to the shaft 323, and the table lifted until the severed sheet of back-lining is engaged by and held down on the table by spring pins 329 carried by the frame bar 330, Figs. 33, 34, 37. These pins prevent the back-lining from being dragged from the table by the cutters, and also press the back-lining down on the table so that the air suction will be effective.

Connected with and opening through the table 310 are a plurality of flexible tubes 331 leading from a header 332, and connected with the header is a flexible tube 333 that leads to a pipe 334, Figs. 33, 35, which is connected with a valve chamber 335, Fig. 2. A vacuum pump 336 driven from the shaft 137, is connected by a pipe 337 with the valve chamber, Fig. 2. The valve in this chamber is connected by a link 338 with a lever 339 that is actuated by a cam in the disk 227, Fig. 2.

At the thirteenth station the back-linings with the head bands are rubbed onto the backs of the fillers by a roll 340; at the fourteenth station they are rubbed around the edges of the fillers by rolls 341; at the fifteenth station they are rubbed by a roll 342; at the sixteenth station the edges are rubbed by rolls 343; at the seventeenth station they are rubbed by a roll 344, Fig. 42. These rolls are preferably pneumatic rolls and they are rotatably mounted on an arbor 345 which is supported by arms 346 that are fastened to a shaft 347, Figs. 42, 43. The shaft 347 is mounted at the ends of swinging arms 348. The arms 346 are connected by bar 349 which by a link 350 is connected with a lever 351 that has a roll 352 in a cam groove in the face of the disk 353 on the cam shaft. This cam through these connections swings the arms 346 so as to carry the rolls back and forth. The shaft 347 is connected by a link 354 with a lever 355 which has a roll 356 in a cam groove in a face of the disk 353. This cam through these connections causes the rolls to travel horizontally when against the back-linings on the backs of the fillers as they are rolled back and forth.

Beneath the rolls 340, 341 and 342 is a tank 357 containing water, and in this tank is a roll 358, Fig. 43. The link connections not only cause the arms 346 to swing back and forth horizontally across the backs of the fillers but at one period bring the rolls 340, 341 and 342 down into contact with the roll 358 so that these rolls become wet and will apply moisture to the back-linings as they rub against them. The cams and link connections are so designed that they first carry all the rolls up against approximately the middle of the backs of the fillers, and then roll first one way and then the other way. The roll 358 is mounted on an arbor 359 which has a sprocket 360 that is connected by a chain 361 with a shaft 362 which has a gear 363. This gear meshes with a gear 364 on a shaft 365 that has a sprocket 366 connected by a chain 367 with a sprocket 368 on the shaft 132, Fig. 43.

After the back-linings and head bands are finally rubbed onto the fillers at the seventeenth station, the fillers are conveyed to the eighteenth station at which nothing is done, this interval allowing the moisture to dry and adhesive to set.

At the nineteenth station the clamps of the conveyer are opened by the mechanism before described, and the fillers allowed to drop onto the vertically movable arms 369, Fig. 45. These arms are mounted on slides 370 fitted to move up and down tracks 371. The slides 370 are connected by links 372 with levers 373 fastened to a shaft 374. One of these arms is connected by a link 375 with a lever 376 which has a roll 377 in a cam groove in the disk 23 on the cam shaft, Figs. 44, 45. This cam is so timed that the arms are lifted for receiving a filler when the conveyer clamp is opened, and then lowered to deposit the filler onto the delivery chains 378. The tracks 371 are slightly inclined, Fig. 45, so that the fillers will tip against the fingers 379, Figs. 44, 45, and not fall from the arms, which when they are lowered pass down between the delivery chains.

The delivery chains pass around idle sprockets 380, and sprockets 381 which are fastened to a shaft 382 that has a sprocket 383 connected by a chain 384 with a sprocket 385 on a shaft 386. The shaft 386 has a gear 387 that engages with a gear 388 on the shaft 132, Figs. 44, 45.

By means of the mechanisms described the fillers are automatically fed edgewise backs down into the machine and elevated to clamps which transfer them sidewise close together with relation to each other. The backs of the fillers are coated with adhesive and two strips of crash are cut from endless supplies and fed lengthwise and applied to the adhesive coated filler backs. Adhesive is applied over the crash, and back-lining strips and head bands are cut from endless supplies and applied to the fillers over the crash. The back-linings are rubbed first by moistened rolls so that they will conform to and closely adhere the filler backs and then by dry rolls, and finally the lined fillers are discharged from the conveyor clamps and delivered from the machine. If no filler is presented to the crash applying stations or to the back-lining station, the mechanisms are tripped so that the feed of crash and back-lining will be interrupted. The actions of the mechanisms at the various stations are continuous and rapid and are acting upon a number of fillers at the same time so that the output of the machine is large.

The invention claimed is:

1. In a machine for back-lining book fillers, a runway for receiving fillers, means for feeding fillers edgewise with their backs down, from the runway into the machine, an elevator for receiving and lifting the fillers with their front edges up, an endless conveyer with clamps extending transverse of its line of travel, for gripping the sides of the lifted fillers, mechanism for intermittently moving the conveyer and carrying the fillers sidewise back down in a straight line through the machine, and mechanisms for applying adhesive, crash and lining to the backs of fillers thus conveyed.

2. The machine of claim 1 characterized by having a spring latch for positioning the fillers in the runway, and means which follows the elevator up and prevents the insertion of a filler in the runway beneath the raised elevator.

3. The machine of claim 1 characterized by having a section of one wall of the runway lifted as the elevator rises for preventing the filler leaves from opening as the elevator carries them up.

4. The machine of claim 1 characterized by having the feeding means reciprocated along the runway by a rotatable cam and link connections therefrom, and oscillated into and out of the runway by a cam carried by the elevator.

5. The machine of claim 1 characterized by having a stop movable along the top of the elevator into engagement with the fillers for positioning them on the elevator, said stop being moved by a fixed cam as the elevator is raised.

6. The machine of claim 1 characterized by having the conveyer comprised of two parallel chains connected transversely by a plurality of relatively fixed clamp jaws and a plurality of clamp jaws movable in relation thereto, with cam actuated segment and gear for intermittently advancing the conveyer.

7. The machine of claim 1 characterized by having the conveyer comprised of two parallel chains connected transversely by a plurality of relatively fixed clamp jaws and a plurality of clamp jaws movable in relation thereto, with cam actuated segment and gear for intermittently advancing said conveyer, said gear being angularly adjustable with relation to the conveyer.

8. The machine of claim 1 characterized by having the conveyer comprised of two parallel chains connected transversely by a plurality of relatively fixed clamp jaws and a plurality of clamp jaws movable in relation thereto, with cam actuated segment and gear for intermittently advancing said conveyer, and a latch for indexing said gear and retaining the conveyer in position when it dwells.

9. The machine of claim 1 characterized by having cam actuated segments and racks for opening the conveyer clamps at the elevator end, and cam actuated segments and racks for opening the conveyer clamps at the discharge end of the machine.

10. The machine of claim 1 characterized by having cam actuated segments and racks for opening the conveyer clamps at the elevator end, said segments being angularly adjustable to vary the opening of the clamps, and cam actuated segments and racks for opening the clamps at the discharge end.

11. In a machine for back-lining book fillers, means for feeding fillers edgewise with their backs down into the machine, an endless conveyer with clamps extending transversely to its line of travel for gripping the sides of the fed fillers, mechanism for intermittently moving the conveyer and carrying the fillers sidewise back down in a straight line through the machine, mechanisms for applying crash and lining to the backs of the fillers thus conveyed, and mechanism for applying adhesive to the backs of the fillers, before and after the application of the crash.

12. The machine of claim 11 characterized by having both of said adhesive applying mechanisms comprising means which travel transversely of the path of the conveyer in a right line lengthwise of the backs of the fillers, and gearing for rotating said means as it travels back and forth.

13. The machine of claim 11 characterized by having both of said adhesive applying mechanisms comprising means which travel transversely of the path of the conveyer in a right line lengthwise of the backs of the fillers in one direction, and swing down for gathering adhesive when traveling in the other direction, and gearing for rotating said means.

14. The machine of claim 11 characterized by having both of said adhesive applying mechanisms comprising adhesive applying rolls, cam actuated connections for moving said rolls transversely of the path of the conveyer, cam actuated connections for causing said rolls to travel in right lines lengthwise of the backs of the fillers in one direction and to swing downward for gathering adhesive when traveling in the other direction, and gearing for continuously rotating said rolls.

15. In a machine for back-lining book fillers, means for receiving and feeding fillers edgewise with their backs down into the machine, an endless conveyer with clamps extending transversely to its line of travel for gripping the sides of the fillers, mechanism for intermittently moving the conveyer and carrying the fillers sidewise back down in a straight line through the machine, mechanism for coating the backs of the fillers with adhesive, and mechanisms for feeding, cutting, drawing in lengthwise, elevating and applying and stretching strips of crash and lining to and about the edges of the adhesive coated backs of the fillers.

16. The machine of claim 15 characterized by having the means for applying the crash strips to the filler backs and the means for stretching the crash strips about the edges of the filler backs mounted on the same elevating frame and spaced apart the distance of one movement of the conveyer chain, and mechanism for elevating said frame.

17. The machine of claim 15 characterized by having a plurality of means for applying crash strips to the filler backs and a plurality of means for stretching the crash strips about the edges of the filler backs spaced from each other the distance of the movements of the conveyer and mounted as a unit on the same elevator, and cam actuated means for raising and lowering said elevator.

18. The machine of claim 15 characterized by having fingers for drawing the severed strips of crash lengthwise into the machine with means for opening the fingers at each end of its movement, ledges for supporting and spring closed grippers for holding the edges of the crash on the ledges, means for lifting the ledges and grippers and applying the crash to the filler backs, and means for opening the grippers after the crash has been applied.

19. The machine of claim 15 characterized by having spring closed fingers for drawing the severed strips of crash lengthwise into the machine with cam actuated means for reciprocating fingers along a rotatable shaft, cam actuated means for rotating said shaft, and eccentric means movable along the shaft but rotatable therewith, for opening the fingers at each end of their movement.

20. In a machine for back-lining book covers, means for receiving and feeding fillers edgewise with their backs down into the machine, an endless conveyer with clamps extending transversely to its line of travel for gripping the sides of the fillers, mechanism for intermittently moving the conveyer and carrying the fillers sidewise back down in a straight line through the machine, mechanism for coating the backs of the fillers with adhesive, mechanism for feeding, cutting, drawing in lengthwise, elevating and applying and stretching strips of crash and lining to and about the edges of the adhesive coated filler backs, and mechanisms for interrupting the crash feed and cutter and the back-lining feed and cutter should the conveyer present no filler at the station preceding the crash applying and back-lining applying stations.

21. The machine of claim 20 characterized by having pins yieldingly mounted adjacent to the path of the fillers, cam actuated means adapted to move the pins into the path of the fillers, and means inactive if the pins engage the fillers and cannot be pushed into their path but that if the pins do not engage fillers is actuated to disconnect the crash and lining drive mechanisms.

22. In a machine for back-lining book fillers, means for feeding fillers edgewise with their backs down into the machine, an endless conveyer with clamps extending transversely to its line of travel for gripping the sides of the fillers, mechanism for intermittently moving the conveyer and carrying the fillers sidewise backdown in a straight line through the machine, means for applying adhesive to the filler backs, mechanisms for feeding a back-lining strip, applying adhesive to the edges of the strip and uniting head bands thereto, mechanisms for cutting the united back-lining strip and head bands and drawing in lengthwise, elevating and pressing the severed pieces to and about the edges of the adhesive coated backs of the fillers, and mechanism for delivering the lined fillers from the machine.

23. The machine of claim 22 characterized by having common rolls for feeding and uniting the back-lining strip and the head bands, and cam actuated mechanism for intermittently rotating said feed rolls.

24. The machine of claim 22 characterized by having common rolls for feeding and uniting the back-lining strip and the head bands, and disks for applying adhesive to the edges of said strip, with inter-connected gearing intermittently rotated by the same cam actuated means for causing the rotation of said rolls and disks.

25. The machine of claim 22 characterized by having disks for applying adhesive to the edges of the head band strip, said disks being raised into contact with said strip and for the engagement of the driving gears, and drawn down into the adhesive tank by spring actuated cam controlled means.

26. The machine of claim 22 characterized by having a table for receiving the severed strips of back-lining and head bands, with means for moving the table horizontally from cutting position to beneath the conveyed fillers and for moving the table vertically at each end of its travel.

27. The machine of claim 22 characterized by having a table for receiving severed strips of back-lining and head bands, with means for moving the table horizontally from cutting position to beneath the fillers and for moving the table vertically at each end of its travel, and means for producing a suction on the surface of the table for holding the linings while conveyed beneath and up against the backs of the fillers.

28. The machine of claim 22 characterized by having a table for receiving severed strips of back-lining and head bands, with means for moving the table vertically at cutting position, means for producing a suction on the surface of the table for retaining the linings thereon, and spring pins for pressing the lining down upon the table when the latter is raised at cutting position to ensure an effective action of the suction means.

29. The machine of claim 22 characterized by having a table for receiving severed strips of back-lining and head bands, with cam actuated means for moving the table horizontally from cutting position to beneath the conveyed fillers, and cam actuated means for lifting the table at each end of its horizontal movement.

30. The machine of claim 22 characterized by having a table for receiving the severed strips of back-lining and head bands, with cam actuated means for reciprocating the table horizontally from cutting position to beneath the conveyed fillers, spring means normally holding the table down, and connected cam actuated levers for lifting the table at each end of its horizontal movement.

31. The machine of claim 22 characterized by having a pin movably mounted a distance equal to one movement of the conveyer in front of the table, cam actuated means adapted to project the pin into the path of the conveyed fillers, and means inactive when the pin engages a filler but when the pin does not engage a filler becomes active and disconnects the back-lining and head band feeding means from the mechanism for actuating said feeding means.

32. In a machine for back-lining book fillers, a runway for receiving fillers, means for feeding fillers edgewise with their backs down, from the runway into the machine, an elevator for receiving and lifting the fillers with their front edges up, an endless conveyer with clamps extending transverse of its line of travel, for gripping the sides of the lifted fillers, mechanism for intermittently moving the conveyer and carrying the fillers sidewise back down in a straight line through the machine, mechanisms for applying adhesive, crash, back-linings and head bands to the backs of fillers thus conveyed, and a plurality of rolls for rubbing the back-linings and head bands into close contact with the backs of the fillers.

33. The machine of claim 32 characterized by having a plurality of pneumatic rolls for rubbing the back-lining and head bands against the backs and about the edges of the fillers, and cam actuated mechanisms for moving said rolls back and forth and up and down.

34. The machine of claim 32 characterized by having cam actuated mechanisms for lifting the rubbing rolls against the backs of the lined fillers at approximately the middle of their length, and cam actuated means for moving said rolls in a straight line first one way and then the other way along the backs of the lined fillers.

35. The machine of claim 32 characterized by having a plurality of rolls mounted on the same swinging frame, cam actuated mechanism for swinging the said frame and carrying all of the rolls together in a straight line across the lined backs of the fillers, and cam actuated mechanism for lifting and lowering the frame and carrying the rolls into and out of engagement with the lined fillers.

36. The machine of claim 32 characterized by having means for moistening a portion of the rubbing rolls prior to their engagement with the back-lining.

37. The machine of claim 32 characterized by having a tank for containing liquid, a roll rotatable in said tank, and cam actuated means for bringing a portion of said rubbing rolls into contact with the tank roll.

38. The machine of claim 32 characterized by having a tank for containing liquid beneath a portion of the rubbing rolls, a roll rotatable in said tank, cam actuated mechanisms for causing some of said rolls to engage with the tank roll and to lift therefrom into contact with the middle of the backs of the fillers, and cam actuated mechanism for causing said rolls to travel in a straight line from the middle of the backs of the fillers first one way and then the other way.

39. The machine of claim 32 characterized by having a tank for containing liquid beneath a portion of said rubbing rolls, a roll mounted in said tank, means for rotating said tank roll, cam actuated mechanisms for causing some of the rubbing rolls to engage with said rotated tank roll, and cam actuated mechanisms for swinging said rubbing rolls back and forth in a right line along the backs of the fillers.

40. The machine of claim 32 characterized by having a plurality of rolls adapted to rub the back-linings and head bands against and about the edges of the fillers, a swinging frame carrying all of said rolls, and cams and links connected to the frame to give the rolls a straight line horizontal movement across the backs of the fillers and a vertical movement into and out of engagement with the fillers.

41. In a machine for back-lining book fillers, means for feeding fillers edgewise with their backs down into the machine, an endless conveyer with clamps extending transversely to its line of travel for gripping the sides of the fillers, mechanism for intermittently moving the conveyer and carrying the fillers sidewise back down in a straight line through the machine, means for applying adhesive to the filler backs, mechanisms for feeding a back-lining strip, applying adhesive to the edges of the strip, and uniting head bands thereto, mechanisms for cutting the united back-lining strip and head bands and pressing the severed pieces to and about the edges of the adhesive coated backs of the fillers, and mechanisms for releasing the fillers from the conveyer and delivering the fillers from the machine.

42. The machine of claim 41 characterized by having means movable up and down for receiving the fillers released from the conveyer, and means for receiving and removing the fillers from the first mentioned means.

43. The machine of claim 41 characterized by having fingers movable up and down for receiving the fillers released from the conveyer, and a chain conveyer for removing the fillers brought down by said fingers and delivering them from the machine.

44. The machine of claim 41 characterized by having an elevator for receiving the fillers released from the conveyer, means for raising and lowering said elevator obliquely, and means for removing the fillers from the elevator and conveying them from the machine.

45. In a machine for back-lining book fillers, means for receiving and feeding fillers edgewise with their backs down into the machine, an elevator for receiving and lifting the fillers with their front edges up, an endless conveyer with clamps extending transversely to its line of travel for gripping the sides of the lifted fillers, mechanism for intermittently moving the conveyer and carrying the fillers sidewise back down in a straight line through the machine, and mechanisms for applying adhesive, a plurality of crash strips, and back-lining strips and head bands to the backs of the fillers thus conveyed, and mechanisms for discharging the lined fillers from the conveyer and delivering them from the machine.

CARL SCHRAMM.
ERNEST WAYNE CLARK.